(12) United States Patent
Sekiguchi et al.

(10) Patent No.: US 10,255,491 B2
(45) Date of Patent: Apr. 9, 2019

(54) GUIDANCE SYSTEM, DETECTION DEVICE, AND POSITION ASSESSMENT DEVICE

(75) Inventors: Masakazu Sekiguchi, Kawasaki (JP);
Tetsuya Yamamoto, Hasuda (JP);
Masahiro Nei, Yokohama (JP);
Masamitsu Yanagihara, Zama (JP);
Satoshi Hagiwara, Yokohama (JP);
Isao Totsuka, Nishitokyo (JP);
Tomoyuki Matsuyama, Kuki (JP)

(73) Assignee: NIKON CORPORATION, Tokyo (JP)

( * ) Notice: Subject to any disclaimer, the term of this patent is extended or adjusted under 35 U.S.C. 154(b) by 854 days.

(21) Appl. No.: 13/885,909

(22) PCT Filed: Oct. 25, 2011

(86) PCT No.: PCT/JP2011/074563
§ 371 (c)(1),
(2), (4) Date: May 16, 2013

(87) PCT Pub. No.: WO2012/066910
PCT Pub. Date: May 24, 2012

(65) Prior Publication Data
US 2013/0242074 A1 Sep. 19, 2013

(30) Foreign Application Priority Data

Nov. 19, 2010 (JP) ................................. 2010-259527
Nov. 19, 2010 (JP) ................................. 2010-259528
Nov. 19, 2010 (JP) ................................. 2010-259529

(51) Int. Cl.
*G06K 9/00* (2006.01)
*G08B 7/06* (2006.01)
*B66B 3/00* (2006.01)

(52) U.S. Cl.
CPC .......... *G06K 9/00369* (2013.01); *B66B 3/006* (2013.01); *G08B 7/066* (2013.01)

(58) Field of Classification Search
CPC ....................................................... G06K 9/00
(Continued)

(56) References Cited

U.S. PATENT DOCUMENTS 5,926,518 A 7/1999 Asokawa
6,501,502 B1 * 12/2002 Chen ................ G08B 13/19634
348/152
(Continued)

FOREIGN PATENT DOCUMENTS

CN 101179710 A 5/2008
CN 101604380 A 12/2009
(Continued)

OTHER PUBLICATIONS

Mar. 24, 2015 Office Action issued in Japanese Patent Application No. 2010-259528.
(Continued)

*Primary Examiner* — Dave Czekaj
*Assistant Examiner* — Shanika M Brumfield
(74) *Attorney, Agent, or Firm* — Oliff PLC

(57) ABSTRACT

To appropriately guide a subject person while protecting a privacy of the subject person despite use of an captured image of the subject person, a guidance system includes: an image capturing unit capable of capturing an image containing a subject person from a first direction; a detection unit that detects a size of an image of the subject person from the image captured by the image capturing unit; and a guidance unit that provides guidance for the subject person based on a detection result of the detection unit.

13 Claims, 18 Drawing Sheets

(58) Field of Classification Search
USPC .......................................................... 348/77
See application file for complete search history.

(56) References Cited

U.S. PATENT DOCUMENTS

| | | | | |
|---|---|---|---|---|
| 7,880,766 | B2* | 2/2011 | Aoki | H04N 7/188 348/143 |
| 8,063,764 | B1* | 11/2011 | Mihailidis | G08B 21/043 340/506 |
| 8,289,377 | B1* | 10/2012 | Tsai | H04N 5/2258 348/47 |
| 2002/0015582 | A1 | 2/2002 | Matsumoto et al. | |
| 2002/0167408 | A1* | 11/2002 | Trajkovic | G06Q 30/06 340/573.1 |
| 2005/0012817 | A1* | 1/2005 | Hampapur | H04N 7/181 348/143 |
| 2006/0001545 | A1* | 1/2006 | Wolf | A47K 3/001 340/573.1 |
| 2006/0184318 | A1* | 8/2006 | Yoshimine | A61F 9/08 701/433 |
| 2006/0241792 | A1* | 10/2006 | Pretlove | G06F 3/011 700/83 |
| 2006/0291694 | A1* | 12/2006 | Venetianer | G06K 9/00369 382/103 |
| 2007/0171053 | A1* | 7/2007 | Heppeler | G08B 7/062 340/541 |
| 2010/0067751 | A1* | 3/2010 | Aoki | G06K 9/00288 382/118 |
| 2011/0267179 | A1* | 11/2011 | Patterson | G08B 7/066 340/286.02 |
| 2012/0250944 | A1* | 10/2012 | Yamamoto | G08B 21/0476 382/103 |
| 2013/0100268 | A1* | 4/2013 | Mihailidis | G08B 21/02 348/77 |

FOREIGN PATENT DOCUMENTS

| | | |
|---|---|---|
| JP | S6442799 A | 2/1989 |
| JP | A-5-2693 | 1/1993 |
| JP | H05-89146 A | 4/1993 |
| JP | A-7-37100 | 2/1995 |
| JP | 07296068 A * | 11/1995 |
| JP | 07296068 A * | 11/1995 |
| JP | A-7-296068 | 11/1995 |
| JP | A-8-66323 | 3/1996 |
| JP | 08124064 A * | 5/1996 |
| JP | 08124064 A * | 5/1996 |
| JP | A-8-150125 | 6/1996 |
| JP | H08-178390 A | 7/1996 |
| JP | 09276428 A * | 10/1997 |
| JP | 09276428 A * | 10/1997 |
| JP | 09325042 A * | 12/1997 |
| JP | 09325042 A * | 12/1997 |
| JP | H10-49718 A | 2/1998 |
| JP | 11182913 A * | 7/1999 |
| JP | 11182913 A * | 7/1999 |
| JP | 2000-207665 A | 7/2000 |
| JP | 2000-348272 A | 12/2000 |
| JP | 2001351190 A * | 12/2001 |
| JP | 2001351190 A * | 12/2001 |
| JP | 2002-044609 A | 2/2002 |
| JP | 2002-123876 A | 4/2002 |
| JP | 2003158655 A * | 5/2003 |
| JP | 2003158655 A * | 5/2003 |
| JP | A-2003-151057 | 5/2003 |
| JP | 2003-162784 A | 6/2003 |
| JP | 2003-162785 A | 6/2003 |
| JP | 2003-233888 A | 8/2003 |
| JP | 2003-308575 A | 10/2003 |
| JP | 2004-072628 A | 3/2004 |
| JP | 2004-093376 A | 3/2004 |
| JP | 2004157771 A * | 6/2004 |
| JP | 2004157771 A * | 6/2004 |
| JP | A-2004-157771 | 6/2004 |
| JP | 2004-212583 A | 7/2004 |
| JP | A-2005-12556 | 1/2005 |
| JP | 2005178935 A * | 7/2005 |
| JP | 2005178935 A * | 7/2005 |
| JP | A-2005-338991 | 12/2005 |
| JP | 2006-041939 A | 2/2006 |
| JP | A-2006-80601 | 3/2006 |
| JP | A-2006-188853 | 7/2006 |
| JP | A-2006-324599 | 11/2006 |
| JP | 2007183233 A * | 7/2007 |
| JP | 2007183233 A * | 7/2007 |
| JP | A-2007-179569 | 7/2007 |
| JP | 2008-052626 A | 3/2008 |
| JP | 2008-052631 A | 3/2008 |
| JP | 2008145383 A * | 6/2008 |
| JP | 2008145383 A * | 6/2008 |
| JP | 2008219223 A | 9/2008 |
| JP | A-2008-225630 | 9/2008 |
| JP | 2008-244812 A | 10/2008 |
| JP | 2008232938 A * | 10/2008 |
| JP | 2008232938 A * | 10/2008 |
| JP | 2008250405 A * | 10/2008 |
| JP | 2008250405 A * | 10/2008 |
| JP | 2009-009413 A | 1/2009 |
| JP | 2009-140407 A | 6/2009 |
| JP | 2010-015466 A | 1/2010 |
| JP | 2010016598 A * | 1/2010 |
| JP | 2010016598 A * | 1/2010 |
| JP | A-2010-44685 | 2/2010 |
| JP | 2010-086314 A | 4/2010 |
| JP | 2010-140193 A | 6/2010 |
| JP | 2012-064141 A | 3/2012 |

OTHER PUBLICATIONS

Jan. 31, 2012 International Search Report issued in Application No. PCT/JP2011/074563 (with translation).
Office Action issued in Japanese Patent Application No. 2010-259527 dated Jul. 29, 2014 (with translation).
Office Action issued in Japanese Patent Application No. 2010-259528 dated Jul. 29, 2014 (with translation).
Office Action issued in Japanese Patent Application No. 2010-259529 dated Jul. 29, 2014 (with translation).
Dec. 29, 2015 Office Action issued in Chinese Patent Application No. 201180055491.4.
Jan. 5, 2016 Office Action issued in Japanese Patent Application No. 2010-259527.
Apr. 26 2016 Office Action issued in Japanese Application No. 2015-105878.
May 31, 2016 Office Action issued in Japanese Application No. 2015-105879.
Jul. 26, 2016 Office Action issued in Japanese Application No. 2015-186077.
Sep. 6, 2016 Office Action issued in Japanese Application No. 2015-186078.
Sep. 6, 2016 Office Action issued in Japanese Application No. 2015-186079.
Sep. 6, 2016 Office Action issued in Japanese Application No. 2015-186075.
Aug. 30, 2016 Office Action issued in Japanese Application No. 2015-186076.
Dec. 6, 2016 Office Action issued in Japanese Application No. 2015-105878.
Sep. 27, 2016 Office Action issued in Japanese Patent Application No. 2015-186080.
Nov. 7, 2017 Office Action issued in Japanese Application No. 2016-225353.
Sep. 4, 2018 Office Action issued in Japanese Patent Application No. 2016-225353.
Dec. 31, 2014 Office Action issued in Chinese Application No. 201180055491.4.
Jan. 29, 2019 Office Action issued in Chinese Patent Application No. 201610804093.2.

* cited by examiner

FIG. 11

| ID | STANDING HEIGHT | SIZE OF IMAGE OF HEAD WHEN STANDING | HEAD IMAGE |
|---|---|---|---|
| 1695026 | 1760 | 1.480 | aaaa.jpg |
| 1786033 | 1600 | 1.238 | aaab.jpg |
| 1394003 | 1800 | 1.350 | aaac.jpg |
| ... | ... | ... | ... |

GUIDANCE SYSTEM, DETECTION DEVICE, AND POSITION ASSESSMENT DEVICE

BACKGROUND ART

There has been conventionally suggested an evacuation guidance system that requires people in an office to have wireless communication devices and provide evacuation guidance when a disaster occurs in the office (e.g. Patent Document 1).

PRIOR ART DOCUMENTS

Patent Documents

Patent Document 1: Japanese Patent Application Publication No. 2005-338991

SUMMARY OF THE INVENTION

Problems to be Solved by the Invention

However, the conventional evacuation guidance system requires people in the office to have wireless communication devices. Thus, a wireless communication device left on, for example, a desk may cause a false detection that a person to be evacuated is at the desk or may interrupt evacuation guidance for the person who left the wireless communication device.

The present invention has been made in view of the above problems, and the object thereof is to provide a guidance system capable of appropriately guiding a subject person. Moreover, the present invention aims to provide a detection device capable of continuously detecting a subject person with a high degree of accuracy. Further, the present invention aims to provide a position assessment device capable of determining a postural state of a subject person with a high degree of accuracy.

A guidance system of the present invention includes: an image capture capable of capturing an image containing a subject person from a first direction; a first detector that detects a size of an image of the subject person from the image captured by the image capture; and a guidance that guides the subject person based on a detection result of the first detector.

In this case, the first detector may detect positional information of the subject person from the image captured by the image capture, and the guidance system may further include a first determiner that determines whether the subject person moves according to the guidance based on the positional information of the subject person.

In addition, in the guidance system of the present invention, the first detector may detect positional information of the subject person from the image captured by the image capture; the guidance may calculate a distance from a reference position based on the positional information of the subject person detected by the first detector, and guide the subject person based on the distance. Moreover, the first detector may detect a size of an image corresponding to a head of the subject person. In this case, the guidance may hold a height of the subject person, a size of the head of the subject person, and personal identification information as data, acquire postural information of the subject person based on the data and the size of the image, and guide the subject person based on the postural information.

In addition, in the guidance system of the present invention, the guidance may determine whether the subject person is in a state where the subject person can be guided based on a detection result of the first detector. In this case, the first detector may detect a change of the size of the image from moment to moment, and the guidance may determine that the subject person is not in the state where the subject person can be guided when capable of determining that the subject person keeps lying on a floor and fails to move for a predetermined time period based on the change of the size of the image from moment to moment.

In addition, the guidance system of the present invention may further include an identifier that identifies the subject person whose image is not captured by the image capture at a first moment from the subject person whose image is to be captured by the image capture; and a second determiner that determines that the subject person whose image is not captured by the image capture at the first moment but is captured at a second moment subsequent to the first moment is the subject person identified by the identifier. Moreover, a blocker that blocks a passage to which the guidance guides the subject person when the first detector fails to detect the size of the image may be further included. Further, a ventilator that discharges air based on a detection result of the first detector may be further included.

In addition, in the guidance system of the present invention, the image capture may be located in both first and second spaces between which the subject person goes back and forth, and the guidance system may further include a third determiner that determines that a person whose image starts to be captured by the image capture located in the first space is a subject person whose image becomes not captured by the image capture located in the second space when the subject person whose image is captured by the image capture located in the second space becomes not imaged. In this case, the second space may be an inside of an elevator, and the first space may be an elevator hall.

In addition, in the guidance system of the present invention, the image capture may include a first image capture and a second image capture separate from the first image capture; the first image capture may be located with respect to the second image capture so that a part of an image capturing region of the first image capture overlaps a part of an image capturing region of the second image capture. Moreover, a route determiner that determines whether a passage to which the subject person is guided is travelable based on a captured result by the image capture and determines a guidance route based on the determination result may be further included In this case, the route determiner may determine whether the subject person can pass through the passage based on a difference between a reference image preliminarily captured by the image capture and an image captured by the image capture after the reference image is captured.

In addition, the guidance system of the present invention may further include a display that displays a captured result by the image capture, and the display may display the image captured by the image capture when the route determiner determines that the subject person can not pass through the passage. Moreover, a route indicator that indicates the guidance route may be further included. Further, a timer that measures time relating to the guidance for the subject person by the guidance may be further included. Moreover, a second detector that detects a presence of the subject person within an image capturing region of the image capture may be further included, and the image capture may switch at least one of start and stop of image capture based on a detection result of the second detector. Further, the first direction may be a vertical direction, and the image capture may capture the image from above a head of the subject person.

A detection device of the present invention includes: a first image capture that captures an image containing a subject person from a first direction; a second image capture that is separate from the first image capture and captures an image containing the subject person from the first direction; and a detector that detects a size of an image of the subject person from the images captured by the first and second image captures, and a part of an image capturing region of the image capture overlaps a part of an image capturing region of the second image capture.

In this case, an amount of the overlap may be an amount based on a size relating to a human body. In this case, the amount of the overlap is an amount based on a size of a human head.

In the detection device of the present invention, a determiner that determines a postural state of the subject person based on a detection result by the detector may be further included. In this case, at least one of the first image capture and the second image capture may be located in a position from which an image of a stairway can be captured. Moreover, the determiner may determine the postural state of the subject person from the size of the image taking into account a height position of a stair on which the subject person is present.

In the detection device of the present invention, a tracker that tracks the subject person by successively using captured results by the first and second image captures of which parts of image capturing regions overlap each other may be further included. Moreover, at least one of start and stop of image capture by the second image capture may be switched when an image of the subject person is captured by the first image capture. Moreover, a calibrator that calibrates, using captured results by the first and second image captures of which parts of image capturing regions overlap each other may be further included.

A position assessment device of the present invention includes: an image capture that captures an image containing a subject person from a first direction; a detector that detects a size of an image of the subject person and positional information of the subject person in an image capturing region of the image capture from the image; and an acquirer that acquires height information of the image capturing region of the image capture; and a determiner that determines a postural state of the subject person based on a detection result of the detector and the height information acquired by the acquirer.

In the position assessment device of the present invention, the acquirer may acquire the height information in association with a position in the image capturing region. In this case, a region of which an image is captured by the image capture may include at least a part of a stairway that the subject person ascends and descends, and the acquirer may acquire height information of each step of the stairway.

The position assessment device of the present invention may further include a detector that detects a presence of the subject person within the image capturing region of the image capture, and the image capture may switch at least one of start and stop of image capture based on a detection result of the detector.

Effects of the Invention

A guidance system of the present invention can appropriately guide a subject person. A detection device of the present invention can continuously detect a subject person with a high degree of accuracy. A position assessment device of the present invention can determine a postural state of a subject person with a high degree of accuracy.

BRIEF DESCRIPTION OF DRAWINGS

FIG. 11 is a diagram illustrating data generated in an entry process;

MODES FOR CARRYING OUT THE INVENTION

Figure 1:
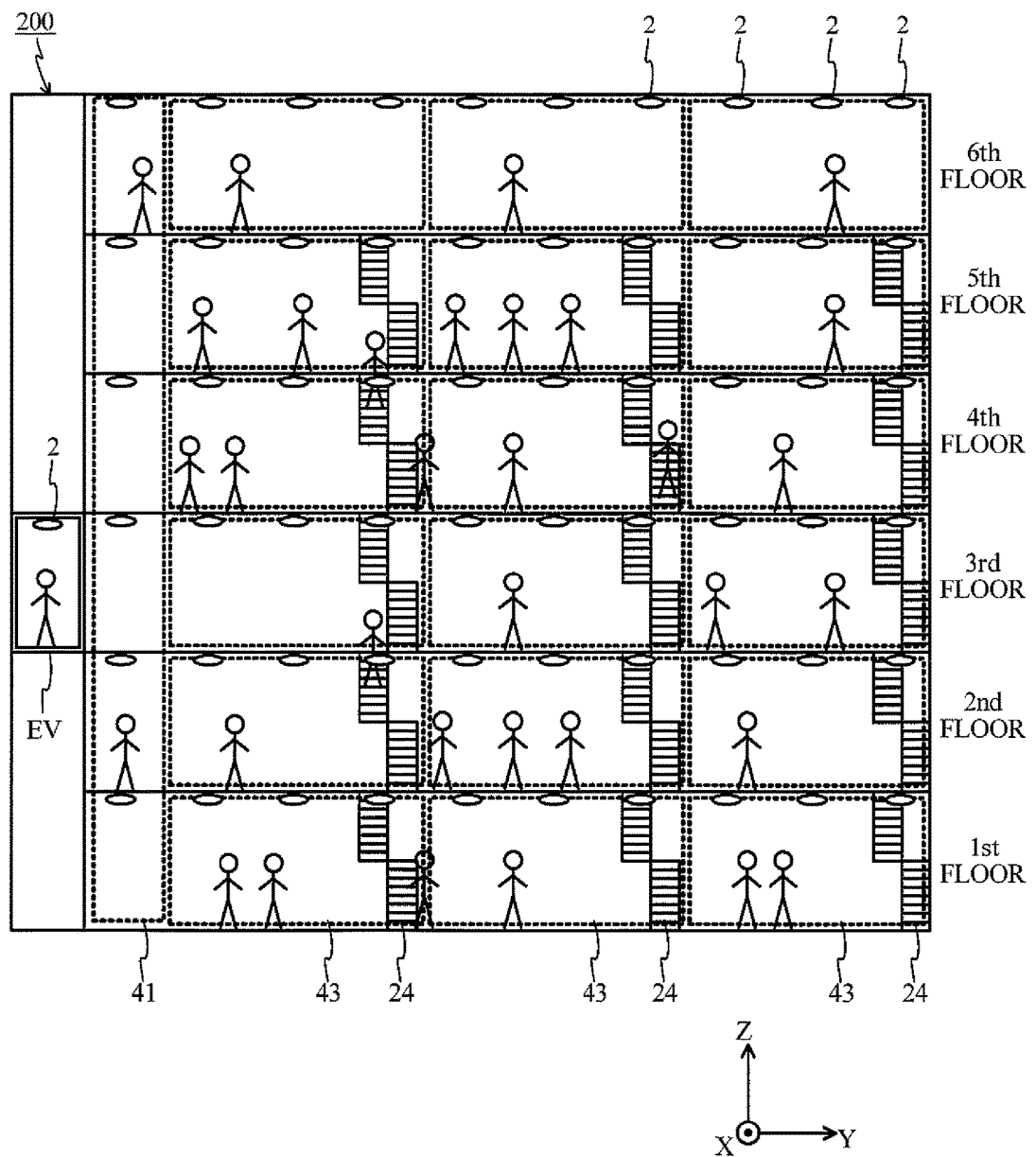
FIG. 1 is a diagram illustrating an office building into which a guidance system in accordance with an embodiment is introduced.

Hereinafter, a description will be given of an embodiment in detail with reference to FIG. 1 through FIG. 18. FIG. 1 illustrates an office building 200 into which a guidance system 100 (see FIG. 2) is introduced. The guidance system 100 may be introduced into school buildings and apartment buildings in addition to office buildings.

As illustrated in FIG. 1, the office building 200 is, for example, a six-story building, and people can move between floors using stairways 24. In addition, the office building 200 has an elevator EV, and use of the elevator EV also allows movement between floors. An elevator hall 41 is located near the elevator EV on each floor. Each floor has three sections (rooms) 43 indicated with dashed lines in FIG. 1. In the present embodiment, the office building 200 has an entrance on the 1st floor.

FIG. 1 illustrates a state where image acquisition devices 2 included in the guidance system 100 are located on the ceiling of each floor. Here, one section 43 is a room that extends in an X-axis direction and a Y-axis direction in FIG. 1, and nine image acquisition devices 2, which form a three by three array in X-axis and Y directions, are installed in the section 43. However, FIG. 1 illustrates a state where three image acquisition devices 2 are installed in each section for convenience. The number of the image acquisition devices 2 may be arbitrarily determined depending on the size of the section 43, or the optical performance of the image capturing unit included in the image acquisition device 2.

Figure 2:
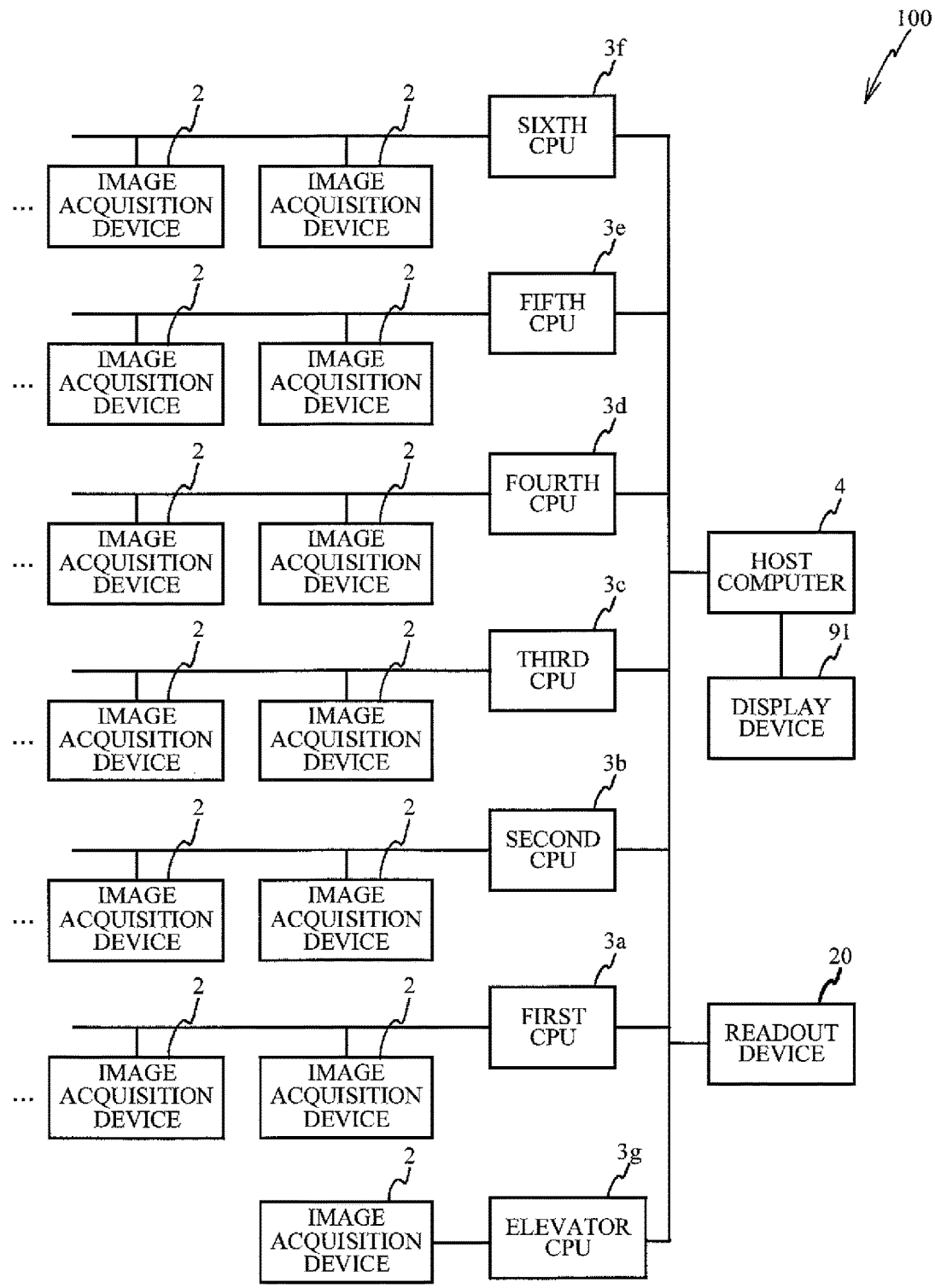
FIG. 2 is a block diagram illustrating the guidance system.

FIG. 2 illustrates the guidance system 100 with a block diagram. As illustrated in FIG. 2, the guidance system 100 includes image acquisition devices 2 located on each floor, first through sixth CPU (3a through 3f) capable of communicating with the image acquisition devices 2 in each room. The guidance system 100 also includes the image acquisition device 2 located in the elevator EV, and an elevator CPU 3g to which the image acquisition device 2 in the elevator EV is coupled. The guidance system 100 further includes a host computer 4 to which the CPUs 3a through 3g are connected, and a readout device 20.

The image acquisition device 2 acquires an image containing a head of a person present in a predetermined region (image capturing region) (subject person to be image-captured (tracked), hereinafter, simply described as "subject person"), and presents an evacuation route to the subject person. Detail configuration of the image acquisition device 2 will be described later.

The first through sixth CPUs (3a through 3f) and the elevator CPU 3g process information acquired by the image acquisition devices 2, and control operation of the image acquisition devices 2. The present embodiment provides one CPU for each floor, but does not intend to suggest any limitation and may provide two or more CPUs for each floor. In this case, CPUs may exchange information with wired or wireless communication units. Detail configuration of the CPUs 3a through 3g will be described later.

The host computer 4 informs people in the office of the occurrence of a disaster and performs evacuation guidance based on the information output from the CPUs 3a through 3g when a disaster such as a fire occurs.

FIG. 2 illustrates the guidance system when the office building 200 is a six-story building, but the CPUs 3b through 3g and the host computer 4 in FIG. 2 may be eliminated when the office building is a one-story building. In this case, the first CPU 3a may have functions of the host computer 4.

The readout device 20 is located near the entrance or reception of the office building 200. The readout device 20 has a card reader capable of reading information recorded in an IC card. A subject person causes the readout device 20 to read personal information by holding an employee ID card (IC card) including an internal memory in which personal information (personal identification information) is recorded over the readout device 20. In addition, when a subject person is a guest, guest information can be read by the readout device 20 by holding a guest ID card (IC card) handed at the reception over the readout device 20.

Figure 3:
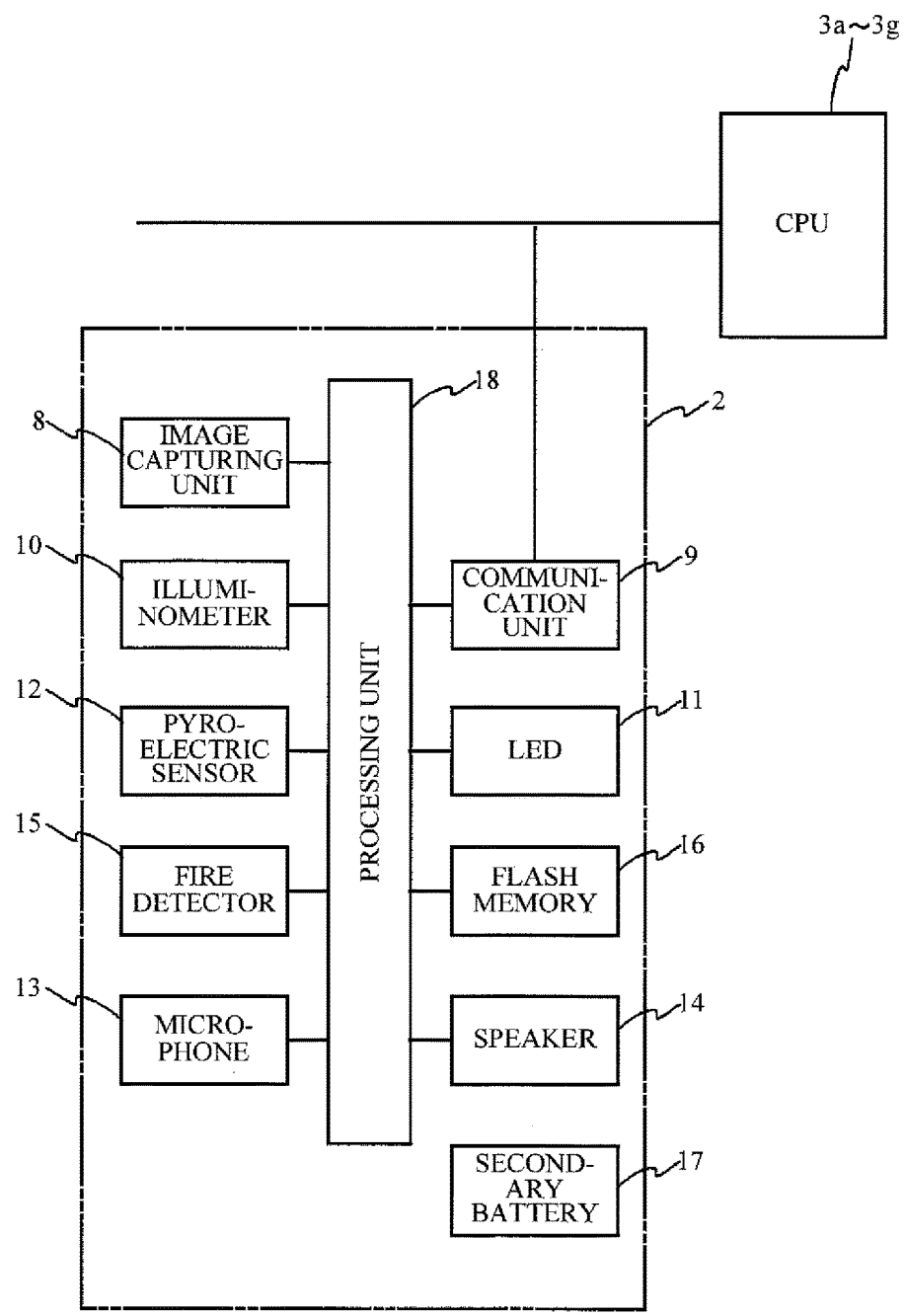
FIG. 3 is a block diagram illustrating an image acquisition device.

A description will now be given of a tangible configuration of the image acquisition device 2 with reference to FIG. 3. FIG. 3 illustrates a block diagram of the image acquisition device 2. As illustrated in FIG. 3, the image acquisition device 2 includes an image capturing unit 8, an illuminometer 10, a pyroelectric sensor 12, a fire detector 15, a microphone 13, a communication unit 9, an LED (Light Emitting Diode) 11, a flash memory 16, a speaker 14, and a processing unit 18. The image acquisition device 2 also includes a secondary battery 17. The image acquisition device 2 normally uses a primary power source (e.g. office power source) to operate.

The image capturing unit 8 captures images inside the office building 200 and images of people present in the office building 200 (subject person). Detail configuration of the image capturing unit 8 will be described later.

The illuminometer 10 measures illuminance within the image capturing region when the image capturing unit 8 captures images inside the office. Measurement results by the illuminometer 10 are supplied to the processing unit 18. The pyroelectric sensor 12 is a sensor for detecting whether a person is present in the image capturing region of the image capturing unit 8. The pyroelectric sensor 12 may be an infrared sensor that detects an infrared ray emitted by people or a pyroelectric sensor including a Fresnel lens. Detection results by the pyroelectric sensor 12 are supplied to the CPU (3a through 3g) through the processing unit 18 and the communication unit 9. The present embodiment sets the viewing angle (detecting angle) and the detecting field of view (detecting distance) of the pyroelectric sensor 12 in accordance with the image capturing region of the image capturing unit 8 so that one pyroelectric sensor 12 can cover the image capturing region of one image capturing unit 8. However, this does not intend to suggest any limitation, and two or more pyroelectric sensor 12 may be provided so as to correspond to the image acquisition devices 2. Or, two or more image acquisition devices 2 may share one pyroelectric sensor 12.

The fire detector 15 is a sensor that detects smoke when a fire occurs, and includes a light emitting unit such as an LED and a light receiving unit such as a PD (Photo Diode) for example. The fire detector 15 receives a reflected light beam of a light beam emitted from the light emitting unit by smoke particles at the light receiving unit to detect a fire. Instead of the sensor detecting smoke, the fire detector 15 may be a sensor that detects heat when a fire occurs. In FIG. 3, each image acquisition device 2 includes one fire detector 15, but each image acquisition device 2 may include two or more fire detectors 15. Or, two or more image acquisition devices 2 may share one fire detector 15.

The microphone 13 acquires a sound such as a voice of a person (subject person), and inputs it to the processing unit 18. The processing unit 18 determines, when the sound input from the microphone 13 is "Help" for example, that a rescue is necessary based on the input sound.

The communication unit 9 communicates with the CPUs 3a through 3g. More specifically, the communication unit 9 includes an antenna, a transmission unit, and a reception unit, and transmits information such as a state of the subject person to the CPU (3a through 3g) to which respective image acquisition devices 2 are directly connected, and communicates with the host computer 4 and other image acquisition devices 2.

The LED 11 illuminates a certain region in the office (e.g. the image capturing region of the image capturing unit 8) in response to the command from the processing unit 18 when the illuminance measured by the illuminometer 10 is low because the lights in the office are partly turned off during evening hours for example. The flash memory 16 is a storage medium that stores captured images and positional information of the subject person present in the office. The speaker 14 announces information for the subject person (information about a state of occurrence of a disaster, information about an evacuation route, and the like).

The processing unit 18 executes a process based on images captured by the image capturing unit 8 and detection results detected by other units, and overall controls processes of the units in the image acquisition device 2.

The secondary battery 17 is a backup power source that supplies power to the image acquisition device 2 when the power is not supplied to the image acquisition device 2 from the primary power source because of a power outage or disaster. The secondary battery 17 may be a lithium-ion battery for example. However, office solar power generation may be used as a secondary battery.

Figure 4:
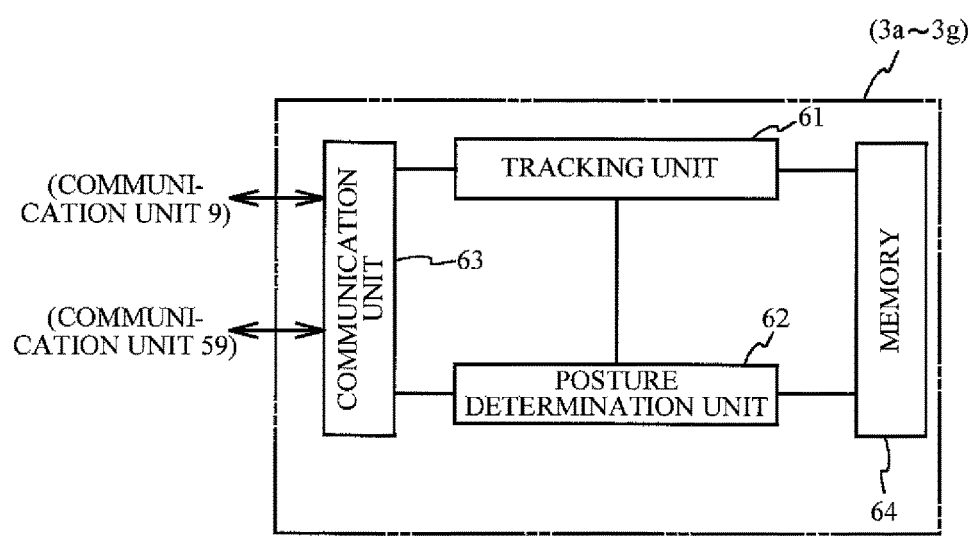
FIG. 4 is a block diagram illustrating functions achieved by execution of programs by a CPU.

FIG. 4 is a block diagram illustrating functions achieved by execution of programs by the CPUs 3a through 3g. As illustrated in FIG. 4, the CPUs 3a through 3g function as a tracking unit 61, a posture determination unit 62, and a communication unit 63. FIG. 4 also illustrates a memory 64 connected to the tracking unit 61 and the posture determination unit 62. The tracking unit 61 tracks a subject person based on the captured result by the image capturing unit 8 while protecting his/her privacy after the subject person enters the office building 200 from the entrance thereof. The posture determination unit 62 determines a posture of the subject person (standing, semi-crouching, lying on the floor, or the like) based on the captured result by the image capturing unit 8 while protecting his/her privacy. The posture determination unit 62 also determines whether something is wrong with the subject person based on the change of the posture. The communication unit 63 exchanges information with the communication unit 9 of the image acquisition device 2 and the host computer 4. For example, while the posture determination unit 62 determines that nothing is wrong with the subject person, the communication unit 63 sends a message reporting that nothing is wrong with the subject person to the host computer 4. In this case, the image captured by the image capturing unit 8 is not transmitted to the host computer 4. This allows the privacy of the subject person to be protected while a state where there is nothing wrong continues. On the other hand, when there occurs something wrong with the subject person, a message reporting that something wrong occurs is sent to the host computer 4, and in this case, the image is allowed to be transmitted to report the situation correctly.

Figure 5A:
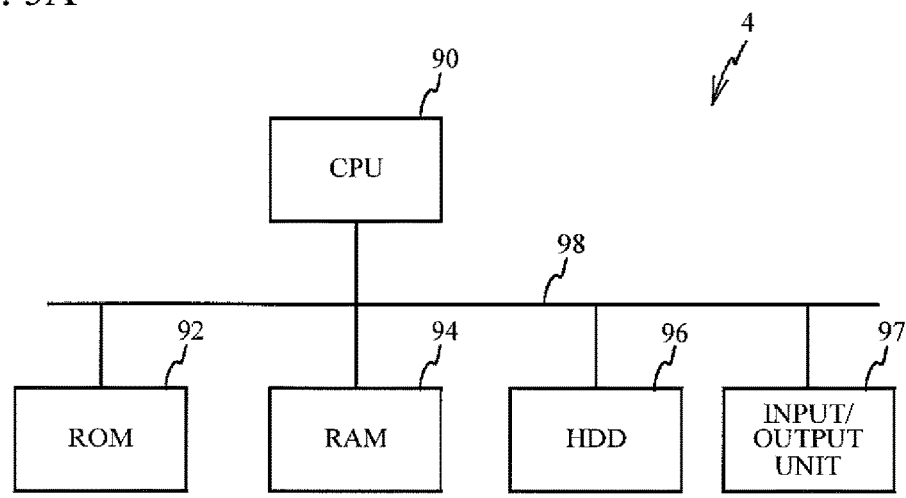
FIG. 5A is a diagram illustrating a hardware configuration of a host computer.

FIG. 5A illustrates a hardware configuration of the host computer 4. As illustrated in FIG. 5A, the host computer 4 includes a CPU 90, a ROM 92, a RAM 94, a storing unit (here, HDD (Hard Disk Drive)) 96, and an input/output unit 97. These components of the host computer 4 are connected to a bus 98. In the host computer 4, the CPU 90 executes programs stored in the ROM 92 or the HDD 96 to achieve functions of units illustrated in FIG. 5B. In addition, devices that drive sprinklers, ventilation systems, and protective barriers (fire doors) in the office are coupled to the input/output unit 97. The sprinklers spray water to extinguish a fire when the fire occurs, and the ventilation systems discharge a toxic gas (smoke, carbon monoxide, and the like) to the outside of the office. The protective barriers (fire doors) are doors that block the flow of the toxic gas, and located in the corridors and stairways. In addition, the input/output unit 97 is wired or wireless connected to a communication device in a fire department or a security company. Accordingly, the host computer 4 can report the occurrence of a disaster to the fire department or the security company through the input/output unit 97. Further, a display device 91 illustrated in FIG. 2 is coupled to the input/output unit 97.

Figure 5B:
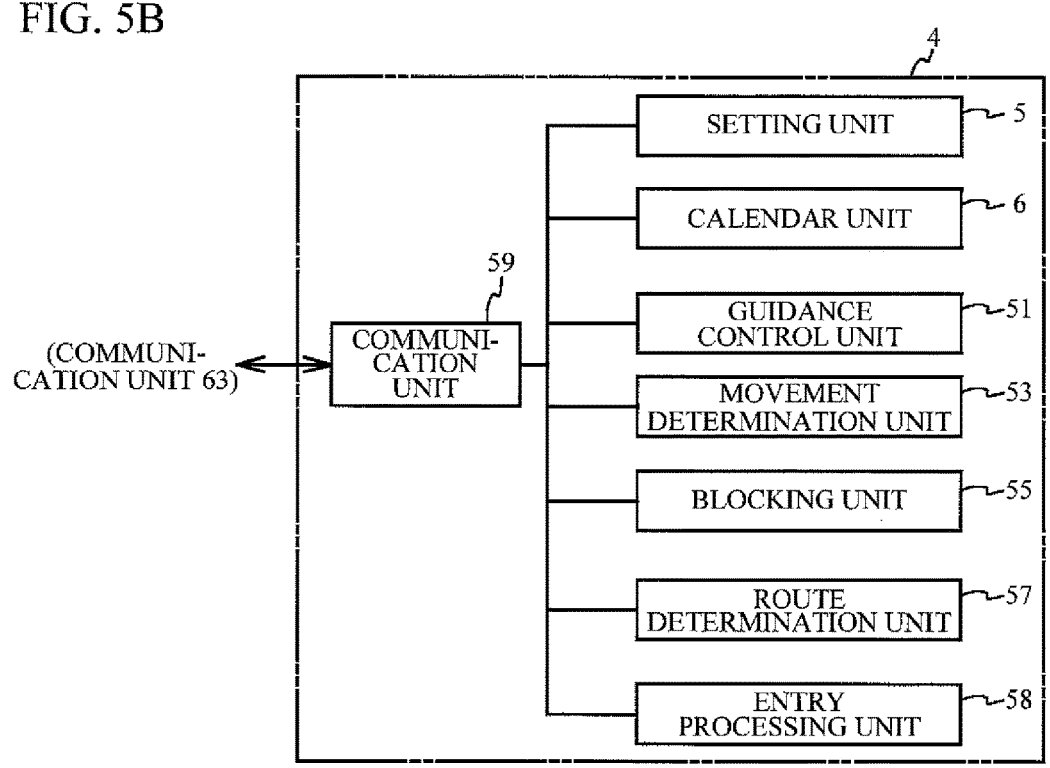
FIG. 5B is a functional block diagram of the host computer.

FIG. 5B illustrates a functional block diagram of the host computer 4. As illustrated in FIG. 5B, the host computer 4 functions as a setting unit 5, a calendar unit 6, a guidance control unit 51, a movement determination unit 53, a blocking unit 55, a route determination unit 57, an entry processing unit 58, and a communication unit 59. The setting unit 5 configures the settings for the image acquisition devices 2. The setting unit 5 sets an interval of time between acquisitions of images by the image acquisition device 2. The calendar unit 6 acquires calendar information such as year, month, day, hour, minute, and second, and has a function of measuring time. The calendar information may be acquired from a CPU crystal oscillator or a time integrated circuit included in the host computer 4.

The guidance control unit 51 controls the operation of each unit (e.g. LED 11) of the image acquisition device 2 to evacuate a subject person based on the captured result by the image capturing unit 8 in a time of disaster (in case of fire). The movement determination unit 53 determines whether the subject person moves as the guidance control unit 51 intends. The blocking unit 55 opens and closes the protective barriers (fire doors) in the office building 200 through the driving device for the protective barriers based on the present position of the subject person obtained from the captured result by the image capturing unit 8. More specifically, the blocking unit 55 blocks the passage to which the guidance control unit 51 guides people with the protective barrier when the size of the image corresponding to the head of the subject person is not detected from the captured result by the image capturing unit 8. In addition, the blocking unit 55 cuts the power supply to the machinery and equipment when a fire occurs. The route determination unit 57 changes the evacuation route in accordance with the state in the office. The entry processing unit 58 executes a process for treating a person entering the office building 200 from the entrance thereof as a subject person. The communication unit 59 transmits the above described processing result of each unit to the communication units 9 of the image acquisition devices 2 via the communication units 63 of the CPUs 3a through 3g.

A detail description will now be given of a tangible structure of the image capturing unit 8 included in the image acquisition device 2 with reference to FIG. 6. The image capturing unit 8 mainly captures the images of heads of people in the office building. Here, each floor has a ceiling height of 2.6 m. In other words, the image capturing unit 8 captures images of the head of the person from 2.6 m of height.

Figure 6:
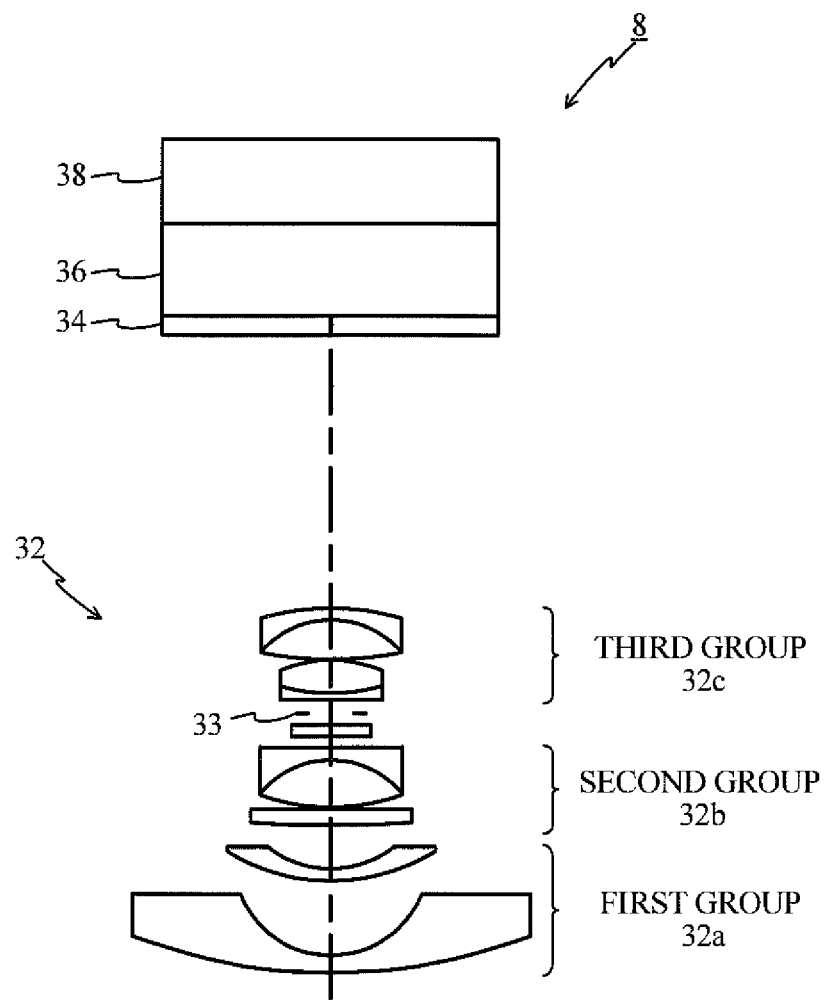
FIG. 6 is a diagram illustrating a tangible structure of an image capturing unit.

As illustrated in FIG. 6, the image capturing unit 8 includes a wide-angle lens system 32 with a three-group structure, a low-pass filter 34, an image sensor 36 including a CCD or CMOS, and a circuit board 38 that controls the drive of the image sensor. FIG. 6 does not illustrate, but a mechanical shutter is located between the wide-angle lens system 32 and the low-pass filter 34.

The wide-angle lens system 32 includes a first group 32a having two negative meniscus lenses, a second group 32b having a positive lens, a cemented lens, and a infrared filter, and a third group 32c having two cemented lenses, and a diaphragm 33 is located between the second group 32b and the third group 32c. The wide-angle lens system 32 of the present embodiment has a focal length of 6.188 mm and a maximum angle of view of 80° throughout the system. The wide-angle lens system 32 is not limited to have a three-group structure. In other words, the number of lenses included in each group, lens constitution, and the focal length and the angle of view may be arbitrarily changed.

The image sensor 36 is 23.7 mm×15.9 mm in size for example, and has 4000×3000 pixels (12 million pixels), for example. That is to say, the size of each one pixel is 5.3 µm. However, the image sensor 36 may be an image sensor having a different size and different number of pixels.

In the image capturing unit 8 having the above described structure, the luminous flux incident on the wide-angle lens system 32 enters the image sensor 36 via the low-pass filter 34, and the circuit board 38 converts the output from the image sensor 36 into a digital signal. Then, the processing unit 18 including an ASIC (Application Specific Integrated Circuit) (see FIG. 3) executes an image processing such as white balance adjustment, sharpness adjustment, gamma correction, and tone adjustment to the image signal converted into the digital signal, and executes an image compression using JPEG or the like. The processing unit 18 also stores still images compressed using JPEG in the flash memory 16.

Figure 12:
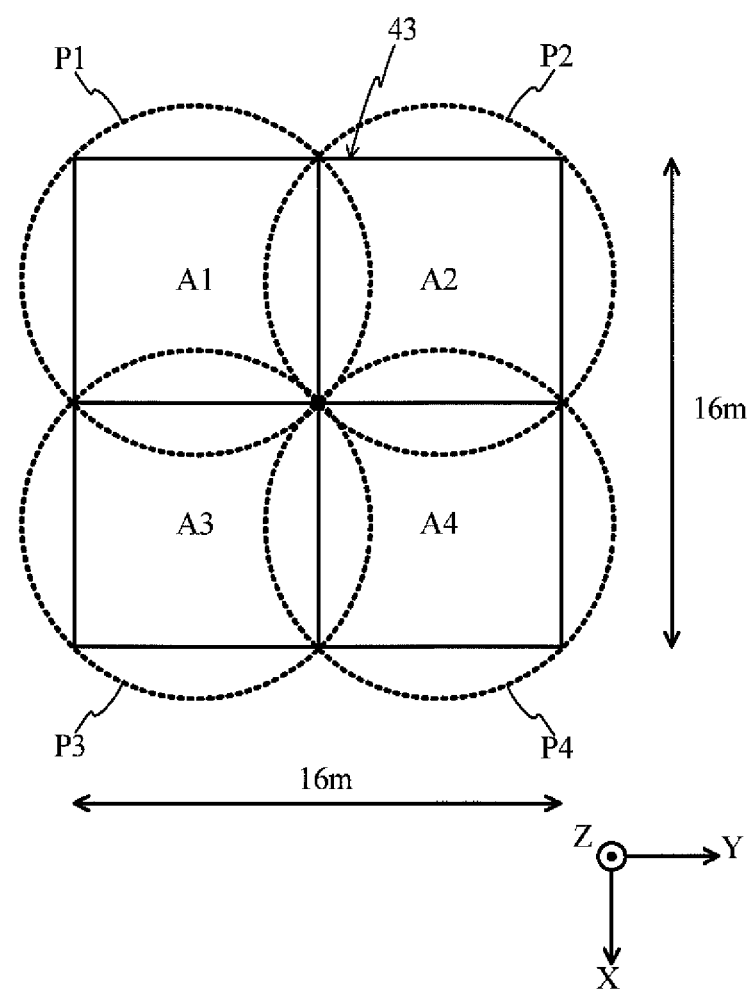
FIG. 12 is a diagram schematically illustrating a relationship between a section in the office building and image capturing regions of the image capturing units in the image acquisition devices located in the section.

The image capturing region of the image capturing unit 8 overlaps the image capturing region of the image capturing unit 8 of the adjoining image acquisition device 2 (see image capturing regions P1 through P4 in FIG. 12). This will be described in detail later.

Figure 7A:
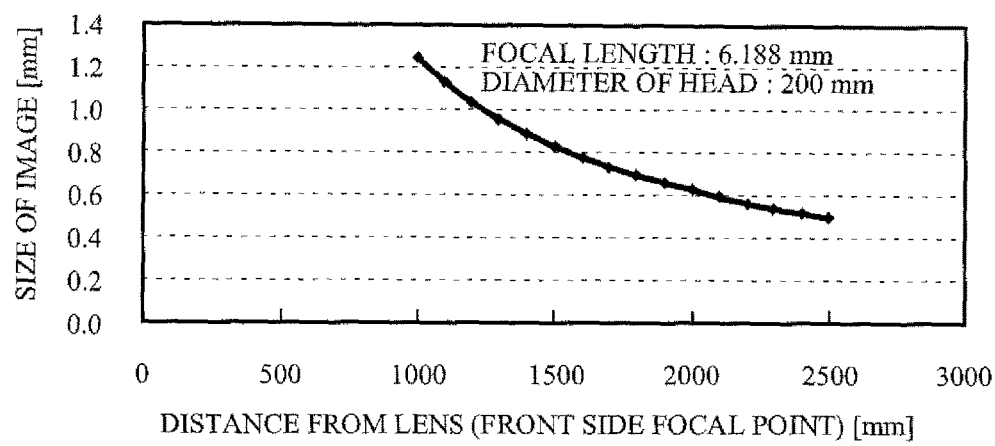
FIG. 7A is a graph illustrating a relationship between a distance from a front side focal point of a wide-angle lens system to a head of a person whose image is captured (subject person) and a size of an image (head portion)
Figure 7B:
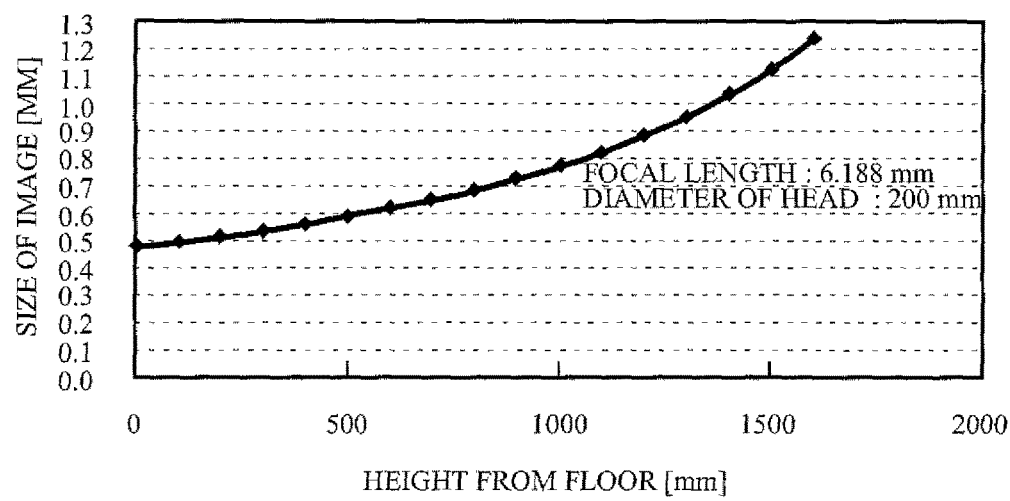
FIG. 7B is a graph that converts the graph in FIG. 7A into height from a floor.

FIG. 7A is a graph illustrating a relationship between a distance from a front side focal point of the wide-angle lens system 32 to a head of a person (subject person) whose image is captured and a size of the image (head portion), and FIG. 7B illustrates a graph in which the distance from the lens in FIG. 7A is converted into the height from the floor.

When the focal length of the wide-angle lens system 32 is 6.188 mm as described previously, and the diameter of the head of the subject person is 200 mm, the diameter of the head of the subject person focused on the image sensor 36 of the image capturing unit 8 is 1.238 mm in a case where the distance from the front side focal point of the wide-angle lens system 32 to the position of the head of the subject person is 1000 mm (in other words, when a 160-centimeter-tall person is standing). On the other hand, when the position of the head of the subject person lowers by 300 mm, and the distance from the front side focal point of the wide-angle lens system 32 to the position of the head of the subject person becomes 1300 mm, the diameter of the head of the subject person focused on the image sensor of the image capturing unit 8 becomes 0.952 mm. In other words, in this case, the change in the height of the head by 300 mm changes the size of the image (diameter) by 0.286 mm (23.1%).

In the same manner, when the distance from the front side focal point of the wide-angle lens system 32 to the position of the head of the subject person is 2000 mm (when the subject person is semi-crouching), the diameter of the head of the subject person focused on the image sensor 36 of the image capturing unit 8 is 0.619 mm, and when the position of the head of the subject person lowers therefrom by 300 mm, the size of the image of the head of the subject person focused on the image sensor of the image capturing unit 8 becomes 0.538 mm. That is to say, in this case, the change in the height of the head by 300 mm changes the size of the image of the head (diameter) by 0.081 mm (13.1%). As described above, in the present embodiment, the change in the size of the image of the head (rate of change) decreases as the distance from the front side focal point of the wide-angle lens system 32 to the head of the subject person increases.

Figure 8:
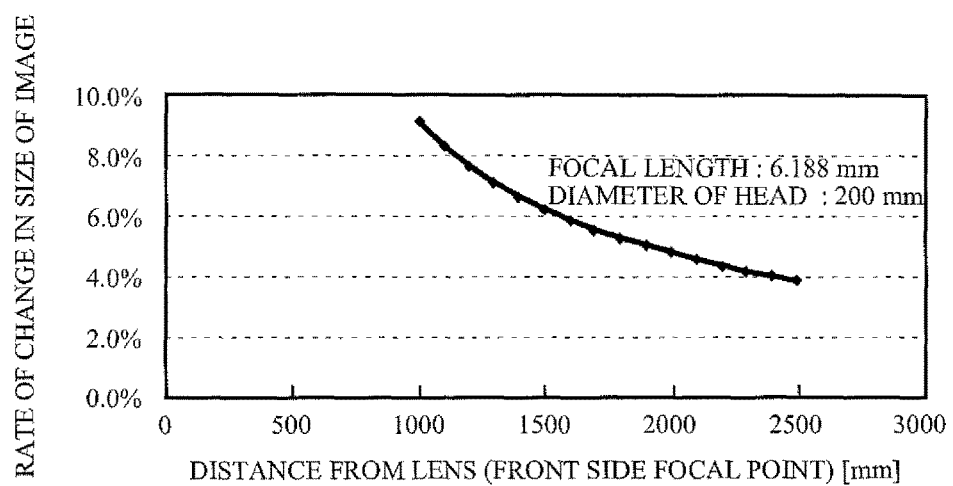
FIG. 8 is a graph illustrating a rate of change in a size of an image.

FIG. 8 is a graph illustrating the rate of change in the size of the image of the head. FIG. 8 illustrates the rate of change in the size of the image when the position of the head of the subject person changes by 100 mm from the height indicated in the horizontal axis. FIG. 8 reveals that two or more subject persons can be easily identified based on a difference in stature if the difference in stature is greater than or equal to approximately 100 mm even though the sizes of their heads are identical because the rate of change in the size of the image is 9.1% and large when the distance from the front side focal point of the wide-angle lens system 32 to the position of the head of the subject person lowers by 100 mm from 1000 mm. In contrast, when the distance from the front side focal point of the wide-angle lens system 32 to the position of the head of the subject person lowers by 100 mm from 2000 mm, the rate of change in the size of the image is 4.8%. In this case, although the rate of change of the image is small compared to the above-described case where the distance from the front side focal point of the wide-angle lens system 32 to the position of the head of the subject person lowers by 100 mm from 1000 mm, the change of the posture of the same subject person can be easily identified.

As described above, use of the captured result by the image capturing unit 8 of the present embodiment allows the distance from the front side focal point of the wide-angle lens system 32 to the subject person to be detected from the size of the image of the head of the subject person, and thus, the posture determination unit 62 of the CPU (3a through 3g) can determine the posture of the subject person (standing, semi-crouching, lying on the floor) and the change of the posture using the detection results. A detail description will be given of this point with reference to FIGS. 9A and 9B.

Figure 9A:
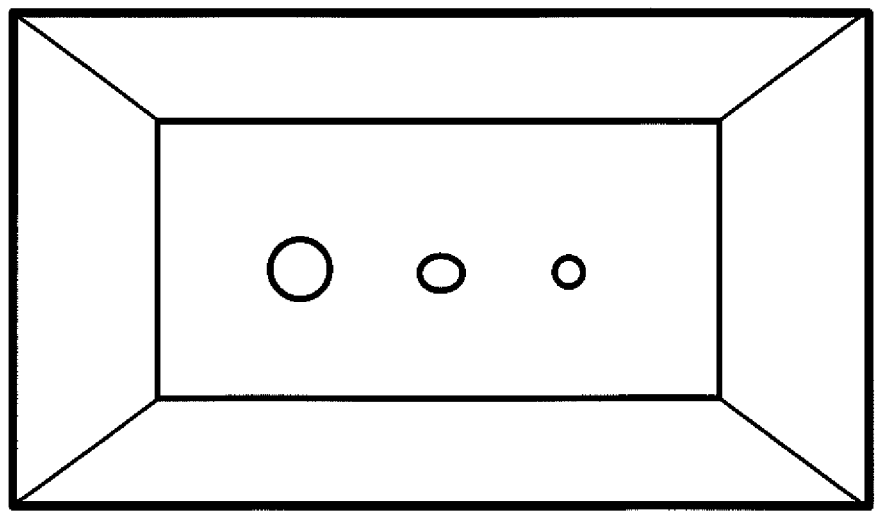
FIG. 9A and FIG. 9B are diagrams schematically illustrating a change of the size of the image of a head in accordance with postures of the subject person.
Figure 9B:
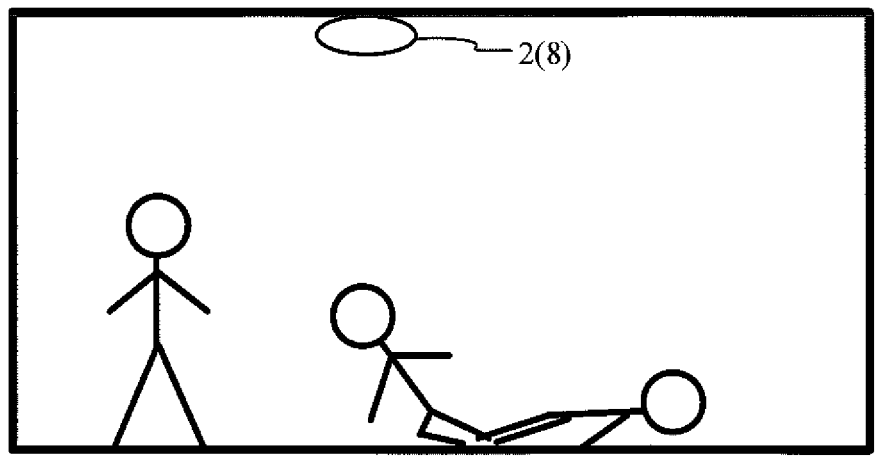

FIG. 9A and FIG. 9B are diagrams schematically illustrating a change of the size of the image of the head in accordance with postures of the subject person. When the image capturing unit 8 located on the ceiling captures an image of the head of the subject person as illustrated in FIG. 9B, the head in the captured image is large as illustrated in FIG. 9A in a case where the subject person is standing as illustrated at the left side of FIG. 9B, and the head in the captured image is small as illustrated in FIG. 9A in a case where the subject person is lying on the floor as illustrated at the right side of FIG. 9B. Moreover, when the subject person is semi-crouching as illustrated at the center of FIG. 9B, the image of the head is larger than that in a case of standing and smaller than that in a case of lying on the floor. Therefore, in the present embodiment, the posture determination units 62 of the CPUs 3a through 3g can determine the state of the subject person by detecting the size of the image of the head of the subject person based on the images transmitted from the image capturing units 8. In this case, the posture and the change of the posture are determined based on the image of the head of the subject person, and thus the privacy is protected compared to the determination using the face or the whole body of the subject person.

FIG. 7A, FIG. 7B, and FIG. 8 illustrate graphs when the subject person is present in the position at which the angle of view of the wide-angle lens system 32 is low (immediately below the wide-angle lens system 32). That is to say, when the subject person is present in a position at a peripheral angle of view of the wide-angle lens system 32, there may be the influence of a distortion depending on an anticipated angle with respect to the subject person. This will now be described in detail.

Figure 10:
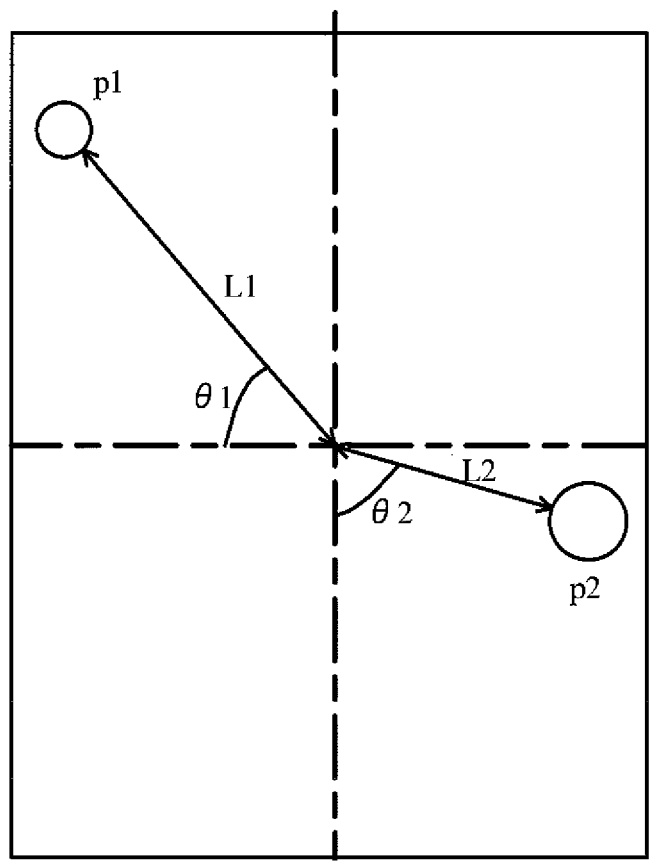
FIG. 10 is a diagram illustrating the change of the size of the image of the head of the subject person whose image is imaged by an image sensor in accordance with positions of the subject person.

FIG. 10 illustrates a change of the size of the image of the head of the subject person imaged by the image sensor 36 in accordance with positions of the subject person. The center of the image sensor 36 is assumed to correspond to the center of the optical axis of the wide-angle lens system 32. In this case, even when the subject person is standing, the size of the image of the head captured by the image capturing unit 8 varies because of the influence of a distortion between a case where he/she is standing immediately below the image capturing unit 8 and a case where he/she is standing away from the image capturing unit 8. Here, when the image of the head is captured at a position p1 of FIG. 10, the captured result enables to obtain the size of the image imaged by the image sensor 36, a distance L1 from the center of the image sensor 36, and the angle θ1 from the center of the image sensor 36. In addition, when the image of the head is captured at a position P2 of FIG. 10, the captured result enables to obtain the size of the image imaged by the image sensor 36, a distance L2 from the center of the image sensor 36, and an angle θ2 from the center of the image sensor 36. The distances L1 and L2 are parameters representing the distance between the front side focal point of the wide-angle lens system 32 and the head of the subject person. The angles θ1 and θ2 from the center of the image sensor 36 are parameters representing an anticipated angle of the wide-angle lens system 32 with respect to the subject person. In such a case, the posture determination unit 62 corrects the size of the captured image based on the distances L1 and L2 from the center of the image sensor 36 and the angles θ1 and θ2 from the center of the image sensor 36. In other words, the size of the captured image at the position p1 of the image sensor 36 is corrected so as to be practically equal to the size of the captured image at the position p2 when the subject person is in the same posture. The above correction allows the present embodiment to accurately detect the posture of the subject person regardless of the positional relationship between the image capturing unit 8 and the subject person (the distance to the subject person and the anticipated angle with respect to the subject person). The parameters used for the correction (correction table) may be stored in the memory 64.

The image capturing unit 8 has a function as a normal camera in addition to the function of acquiring the head image of the subject person. That is to say, a zoom lens added to the wide-angle lens system 32 can continuously capture images of the eye and mouth of the subject person when the subject person is lying on the floor for example. In this case, the processing unit 18 can determine whether the eye is open or the eyeball is moving by pattern matching, or whether the subject person is breathing based on movement of the mouth.

In addition, the image capturing unit 8 may employ a contrast AF that extracts a high-frequency component from the signal supplied from the image sensor 36 and detects a focal point by detecting a lens position at which the high-frequency component becomes largest. In this case, adjustment of a part of the wide-angle lens system 32 allows the images to be obtained in focus.

Here, the setting unit 5 of the host computer 4 sets time intervals at which images are captured by the image capturing unit 8. The setting unit 5 can change image capture frequency (frame rate) between a time period in which many people are in the office and a time period other than that. For example, the setting unit 5 may set the time intervals so that one still image is captured per minute (32400 images per day) when determining that the current time is in a time period in which many people are in the office (for example, from 9:00 am to 6:00 pm) based on the calendar information acquired from the calendar unit 6, and may set the time intervals so that one still image is captured at 5-second intervals (6480 images per day) when determining the current time is in the other time period.

In addition, in the present embodiment, the image acquisition device 2 includes the pyroelectric sensor 12, and thus the processing unit 18 controls the timing at which an image is captured by the image capturing unit 8 based on the output from the pyroelectric sensor 12. More specifically, the processing unit 18 causes the image capturing unit 8 with the image capturing region the absence of a person in which is determined not to capture images, and causes the image capturing unit 8 with the image capturing region the presence of a person in which is determined to start capturing images based on the output from the pyroelectric sensor 12. This control can reduce the electrical power used by the image capturing unit 8 and save the storage area of the flash memory 16. To save the storage area of the flash memory 16, the captured still images may be temporarily stored in the flash memory 16, and then deleted from the flash memory 16 after captured data for one day is transferred to the host computer 4 for example.

In the present embodiment, the image acquisition device 2 includes the illuminometer 10, and thus the processing unit 18 determines imaging time and ISO sensitivity with which the image capturing unit 8 captures still images based on the illuminance detected by the illuminometer 10. In this case, for example, when the office room is dark, the ISO sensitivity may be increased and imaging time may be prolonged. When the lights in the office can not be used at all because of a power outage, the CPUs (3a through 3g) or the host computer 4 switches the power source for the image acquisition devices 2 from the primary power source to the secondary battery 17, and then the processing unit 18 may illuminate the office by the LED 11, and cause the image capturing unit 8 to capture images under this condition. In this case, the processing unit 18 may identify the position of the subject person with the pyroelectric sensor 12 and control the lighting direction of the LED 11 so that the light illuminates the identified position. In such a case, the image can be captured under the condition in which the subject person is efficiently illuminated. The LED 11 may be located on the ceiling, or located in an arbitrary location in the office. In addition, other optical sources may be employed instead of the LED.

Further, captured still images of the subject person are only required to be clear enough to detect a problem of the subject person, and therefore, those still images differ from conventional still images for viewing. When images are captured in a dark-lit room, the infrared filter provided in the wide-angle lens system 32 may be retracted by a retracting mechanism (not illustrated) so as to secure a sufficient amount of light.

A description will now be given of the process by the guidance system 100 configured as described above.

(Process in Normal Times (when a Disaster does not Occur))

A description will first be given of the process in normal times, that is to say, when a disaster does not occur.

(1) Entry Process

The following describes an entry process when the subject person enters the office building 200. The entry processing unit 58 of the host computer 4 controls the image acquisition device 2 (image capturing unit 8) located at the entrance of the office building 200 (on the 1st floor as described previously) to capture the head of the entering person who is standing near the entrance. In addition, the host computer 4 acquires the personal information of the entering person from the employee ID card (ID card) held by the entering person with the readout device 20. The above process enables to obtain the data relating the personal information (e.g. personal ID) of the entering person, the size of the image of the head when standing (the size of the image of the head when standing may represent the size of the head in relation to the height), and the height (see FIG. 11). The height may be preliminarily associated with the personal information, or may be detected with a separate image capturing device or distance sensor when the image of the head is captured. The latter method allows the height to be obtained even though the entering person is a guest. The separate image capturing device may be an image capturing device that captures images of the subject person from the horizontal direction. If the image is captured while keeping the distance from the separate capturing device to the subject person constant, the height of the subject person can be calculated from the captured result. In addition, a laser range finder or the like may be used for the distance sensor.

The entry processing unit 58 stores the head image of the subject person in the internal memory, and registers the file name of the image file to the data illustrated in FIG. 11 as the head image.

The present embodiment relates the height when the entering person is standing and the size of the image of the head (see FIG. 11), and accordingly the tracking units 61 of the CPUs 3a through 3g can prepare a graph such as the graph illustrated in FIG. 7B for each entering person as the information for tracking the entering person. The graph illustrated in FIG. 7B is a graph for tracking the entering person second from the top in FIG. 11 (entering person with an ID of 1786033). Graphs adapting to the relationship between the height and the size of the image of the head are to be prepared for other entering persons.

(2) Tracking Process of the Subject Person on the 1st Floor

A description will next be given of the tracking process of the subject person on the 1st floor after the subject person (entering person to which the entry process is performed) enters the office building 200. Here, the tracking unit 61 of the CPU 3a tracks the subject person under the control by the host computer 4.

FIG. 12 is a diagram schematically illustrating a relationship between one section 43 in the office building 200 and the image capturing regions of the image capturing units 8 in the image acquisition devices 2 located in the section 43. In FIG. 1, nine image capturing units 8 are located in one section 43, but here four image capturing units 8 are located in one section 43 (only four image capturing regions P1, P2, P3, and P4 are illustrated) for convenience. One section is 256 m² (16 m×16 m). Further, the image capturing regions P1 through P4 are circle regions, and overlap the adjoining image capturing regions in the X direction and the Y direction. FIG. 12 illustrates divided areas formed by dividing one section into four (corresponding to the image capturing regions P1 through P4) as divided areas A1 through A4. In this case, if the wide-angle lens system 32 has an angle of view of 80°, a focal length of 6.188 mm, the height of the ceiling is 2.6 m, and the height of the subject person is 1.6 m, a region within a circle having a center immediately below the wide-angle lens system 32 and a radius of 5.67 m (approximately 100 m²) becomes the image capturing region. That is to say, each of the divided areas A1 through A4 has an area of 64 m², and thus the divided areas A1 through A4 can be included in the image capturing regions P1 through P4 of the image capturing units 8 respectively, and parts of the image capturing regions of the image capturing units 8 can overlap each other.

FIG. 12 illustrates the concept of the overlap among the image capturing regions P1 through P4 from the object side, but the image capturing regions P1 through P4 represent the regions in which light enters the wide-angle lens system 32, and all the light incident on the wide-angle lens system 32 do not enter the rectangular image sensor 36. Thus, in the present embodiment, the image capturing units 8 have only to be located in the office so that the image capturing regions P1 through P4 of the adjoining image sensors 36 overlap each other. More specifically, the image capturing unit 8 includes an adjustment portion (e.g. an elongate hole, a large adjustment hole, or a shift optical system adjusting an image capturing position) for adjusting the installation thereof, and the installation positions of the image capturing units 8 are determined by adjusting the overlap while visually confirming the images captured by the image sensors 36. When the divided area A1 illustrated in FIG. 12 coincides with the image capturing region of the image sensor 36 for example, the images captured by the image capturing units 8 do not overlap but coincide with each other. However, the image capturing regions P1 through P4 of the image sensors 36 preferably overlap each other as described previously in terms of the degree of freedom in installing the image capturing units 8 and the difference in installation height due to a beam in the ceiling.

The overlapping amount can be determined based on a size of a human head. In this case, when the outer periphery of the head is 60 cm, it is sufficient if a circle with a diameter of approximately 20 cm is included in the overlapping region. When only a part of the head should be included in the overlapping region, it is sufficient if a circle with a diameter of approximately 10 cm is included. If the overlapping amount is set as described, the adjustment in installing the image capturing unit 8 on the ceiling becomes easy, and the image capturing regions of the image capturing units 8 can overlap each other without adjustment in some situations.

Hereinafter, a description will be given of the tracking process when four subject persons (described as subject persons A, B, C, and D) move within one section 43 in FIG. 12 with reference to FIG. 13A through FIG. 14C. Each subject person has been continuously tracked since he/she entered the office building 200, and thus the CPU 3a can identify whose head the head of each subject person is.

Figure 13A:
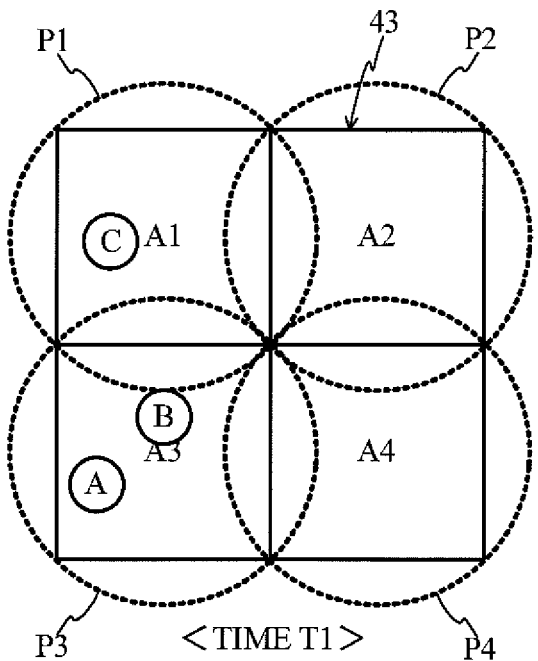
FIG. 13A and FIG. 13B are diagrams (No. 1) for explaining a tracking process when four subject persons (described as subject persons A, B, C, D) move in the section in FIG. 12.

FIG. 13A illustrates a state at time T1. FIG. 13B through FIG. 14C illustrate states after time T1 (time T2 through T5).

At time T1, the subject person C is present in the divided area A1, and the subject persons A and B are present in the divided area A3. In this case, the image capturing unit 8 with the image capturing region P1 captures an image of the head of the subject person C, and the image capturing unit 8 with the image capturing region P3 captures images of the heads of the subject persons A and B.

Then, at time T2, the image capturing unit 8 with the image capturing region P1 captures an image of the head of the subject persons B and C, and the image capturing unit 8 with the image capturing region P3 captures an image of the head of the subject persons A and B.

Figure 13B:
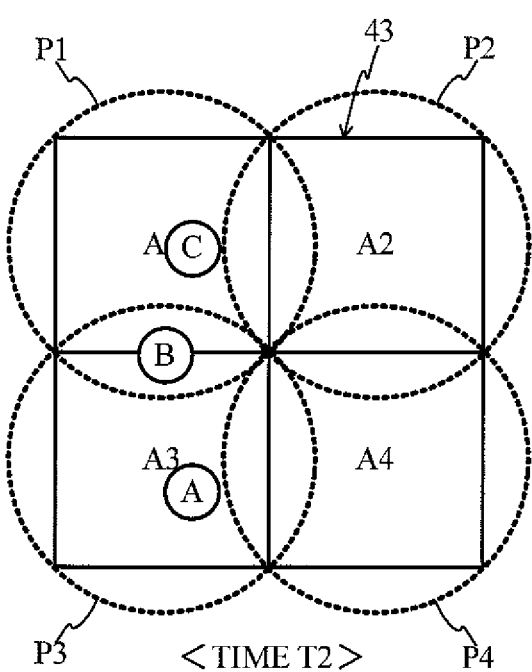

In this case, the tracking unit 61 of the CPU 3a recognizes that the subject persons A and C move in the horizontal direction in FIG. 13B, and the subject person B moves in the vertical direction in FIG. 13 based on the captured results by the image capturing units 8 at times T1 and T2. The reason why the images of the subject person B are captured by two image capturing units 8 at time T2 is because the subject person B is present in the area where the image capturing regions of two image capturing units 8 overlap each other.

Figure 14A:
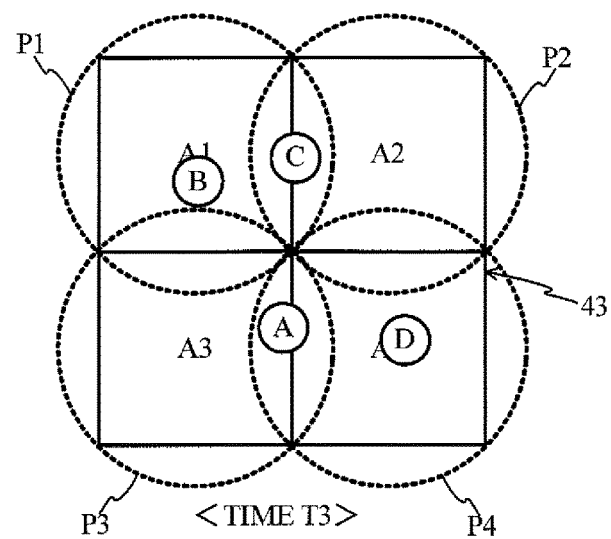
FIG. 14A through FIG. 14C are diagrams (No. 2) for explaining the tracking process when four subject persons (described as subject persons A, B, C, D) move in the section in FIG. 12.

Then, at time T3, as illustrated in FIG. 14A, the image capturing unit 8 with the image capturing region P1 captures an image of the head of the subject persons B and C, the image capturing unit 8 with the image capturing region P2 captures an image of the head of the subject person C, the image capturing unit 8 with the image capturing region P3 captures an image of the head of the subject person A, and the image capturing unit 8 with the image capturing region P4 captures an image of the head of the subject persons A and D.

In this case, the tracking unit 61 recognizes that the subject person A is present in the boundary between the divided area A3 and the divided area A4 (moving from the divided area A3 to the divided area A4), the subject person B is present in the divided area A1, the subject person C is present in the boundary between the divided area A1 and the divided area A2 (moving from the divided area A1 to A2), and the subject person D is present in the divided area A4 at time T3.

Figure 14B:
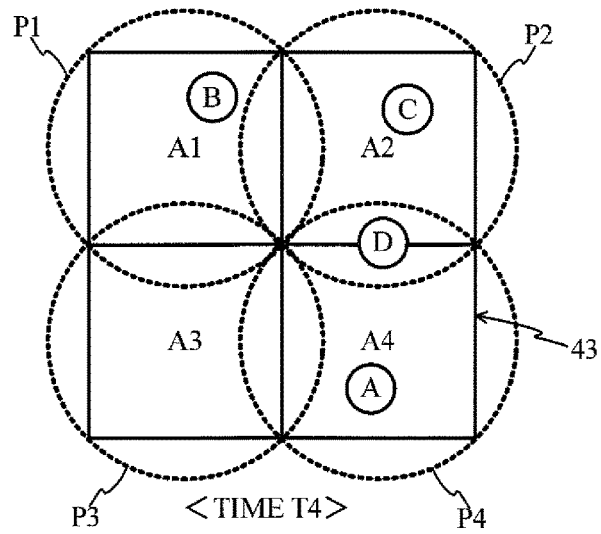
Figure 14C:
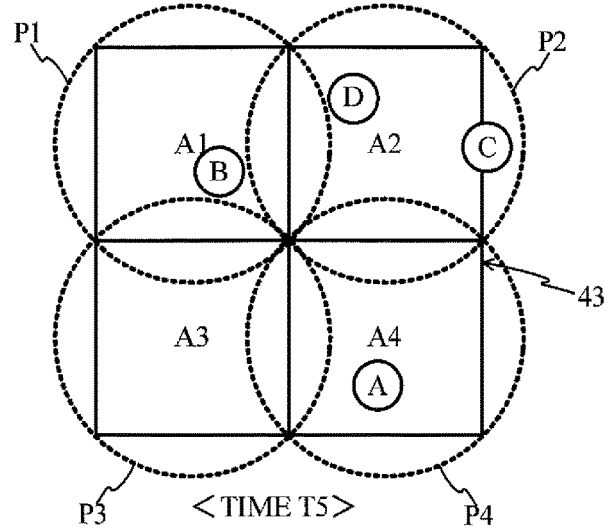

In the same manner, the tracking unit 61 recognizes that the subject person A is present in the divided area A4, the subject person B is present in the divided area A1, the subject person C is present in the divided area A2, and the subject person D is present between the divided areas A2 and A4 at time T4 as illustrated in FIG. 14B. In addition, the tracking unit 61 recognizes that the subject person A is present in the divided area A4, the subject person B is present in the divided area A1, the subject person C is present in the divided area A2, and the subject person D is present in the divided area A2 at time T5 as illustrated in FIG. 14C.

The present embodiment causes the image capturing regions of the image capturing units 8 to overlap each other as described above, and thereby allows the tracking unit 61 to recognize the position and moving direction of the subject person. As described above, the present embodiment allows the tracking unit 61 to continuously track each subject person on the 1st floor with a high degree of accuracy. The tracking unit 61 can identify the number of subject persons present on the 1st floor of the office building 200 based on the number of tracked subject persons.

During the continuous tracking of the subject persons, when the size of the image of the head changes, the posture determination unit 62 can determine the posture of the subject person (lying on the floor, semi-crouching, standing, or the like) using the size of the image of the head and the data (associated with each subject person) illustrated in FIG. 7B.

In addition, the processing unit 18 may perform calibration between the image capturing units 8 of which parts of the image capturing regions overlap each other using the captured results by the image capturing units 8 of which parts of the image capturing regions overlap each other. That is to say, when two image capturing units of which parts of the image capturing regions overlap each other capture the head images of the same subject person, the processing unit 18 calibrates the captured result by at least one of the image capturing units so that the sizes of the images of the heads become identical to each other even though the sizes of the images of the heads differ from each other. This can reduce the effect of the error in capturing images between the image capturing units.

(3) Tracking Process of the Subject Person in the Elevator EV

A description will now be given of a tracking method of the subject person in the elevator EV with reference to FIG. 15A through FIG. 16C.

When the subject person uses the elevator EV to move another floor, the tracking unit 61 of the CPU 3g and the tracking units 61 of the CPUs 3a through 3f are used to track the subject person.

Figure 15A:
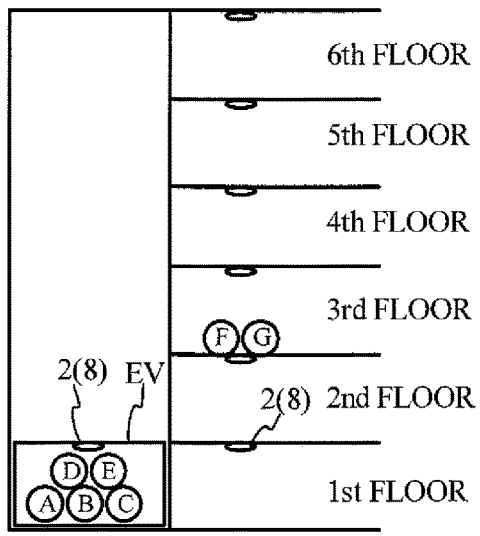
FIG. 15A through FIG. 15D are diagrams (No. 1) for explaining a method for tracking a subject person in an elevator EV.
Figure 15B:
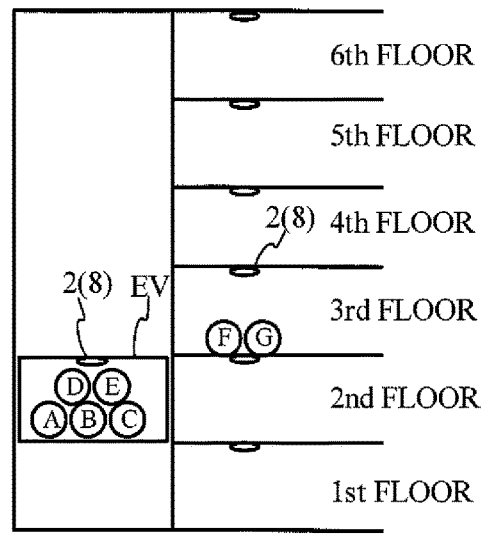
Figure 15C:
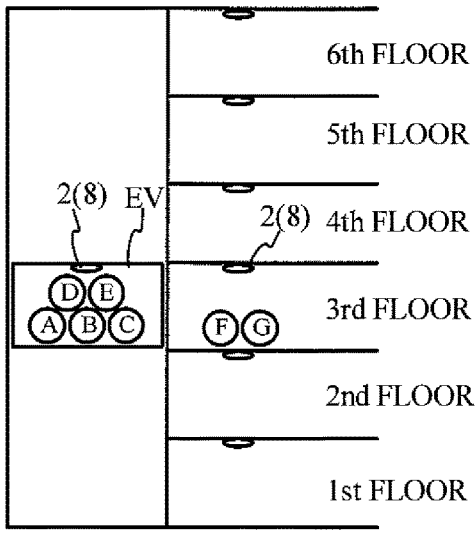
Figure 15D:
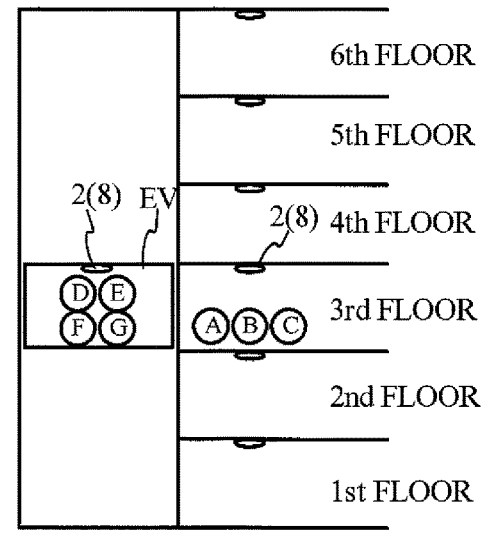
Figure 16A:
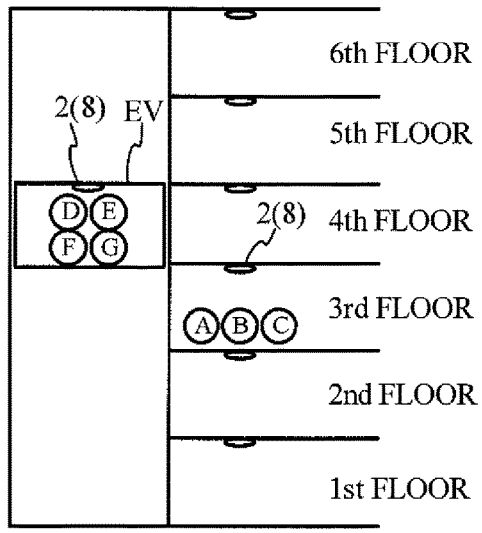
FIG. 16A through FIG. 16C are diagrams (No. 2) illustrating the method for tracking the subject person in the elevator EV.
Figure 16B:
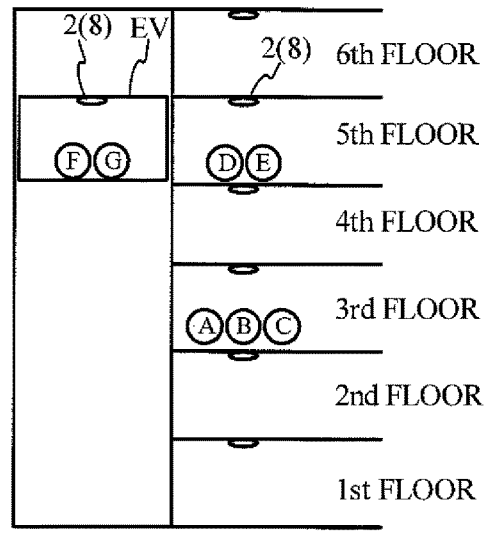
Figure 16C:
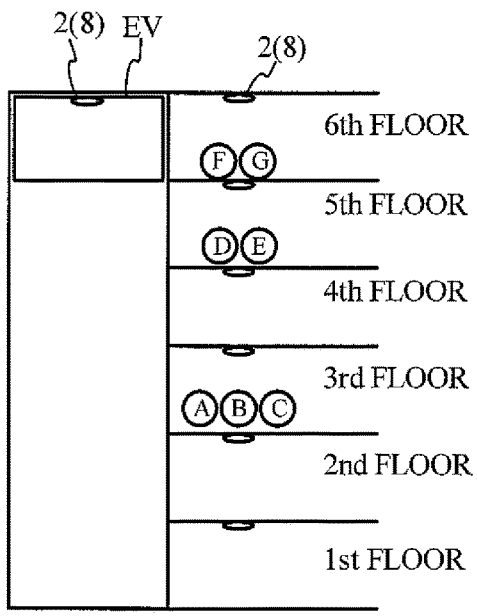

Here, for example, assume as follows: Five persons (subject persons A through E) ride the elevator EV from the 1st floor as illustrated in FIG. 15A, the elevator EV passes the 2nd floor without stopping as illustrated in FIG. 15B, and the elevator EV stops at the 3rd floor as illustrated in FIG. 15C. Then, three persons (subject persons A through C) step out of and two persons (subject persons F and G) ride the elevator EV at the 3rd floor as illustrated in FIG. 15D, the elevator EV passes the 4th floor without stopping as illustrated in FIG. 16A, and two persons (subject persons D and E) step out of the elevator EV at the 5th floor as illustrated in FIG. 16B. Then, remaining two persons (subject persons F and G) step out of the elevator at the 6th floor as illustrated in FIG. 16C.

In the above described case, the image capturing unit 8 located on the ceiling of the elevator EV captures the images of the heads of five persons who ride the elevator from the 1st floor, and outputs the captured result to the tracking unit 61 of the first CPU 3a for the 1st floor and the tracking unit 61 of the elevator CPU 3g. The output to the tracking unit 61 of the first CPU 3a is performed via the communication unit 63 of the elevator CPU 3g. In this case, the tracking unit 61 of the first CPU 3a recognizes that the subject persons A through E ride the elevator EV from the 1st floor and start moving based on the captured results of the subject persons waiting for the elevator EV at the elevator hall 41 on the 1st floor and the captured result by the image capturing unit 8 in the elevator EV.

Instead of the above described method, the tracking unit 61 of the first CPU 3a for the 1st floor may recognize that the subject persons A through E ride the elevator EV and start moving based on the fact that the head images of the subject persons A through E become not acquired in the captured result by the image capturing unit 8 located in the elevator hall on the 1st floor.

The tracking unit 61 of the first CPU 3a for the 1st floor transmits the result recognized as described above to the tracking unit 61 of the elevator CPU 3g. The elevator CPU 3g can recognize that the persons who got on the elevator are the subject persons A through E based on the recognition result of the tracking unit 61 of the first CPU 3a for the 1st floor.

In the situation illustrated in FIG. 15D, after the elevator stops at the 3rd floor, the tracking unit 61 of the third CPU 3c for the 3rd floor and the tracking unit 61 of the elevator CPU 3g exchange the captured results prior to and subsequent to the opening and closing of the elevator EV. That is to say, while the tracking unit 61 of the third CPU 3c becomes unable to recognize the head images of the subject persons F and G, the tracking unit 61 of the elevator CPU 3g recognizes that the subject persons F and G ride the elevator from the 3rd floor based on the fact that the head images of the subject persons F and G are output in the tracking unit 61 of the elevator CPU 3g immediately after that. Likewise, the tracking unit 61 of the third CPU 3c becomes able to recognize the head images of the subject persons A through C, but fails to recognize whose head the recognized head is. Thus, the tracking unit 61 of the elevator CPU 3g outputs the head images of the subject persons A through C to the tracking unit 61 of the third CPU 3*c* for the 3rd floor when it becomes unable to capture the head images of the subject persons A through C in the elevator EV, and thereby the third CPU 3*c* recognizes that the persons who stepped out of the elevator EV at the 3rd floor are the subject persons A through C by pattern matching between the head images of the subject persons A through C supplied from the elevator CPU 3*g* and the image captured by the image capturing unit 8 located in the elevator hall on the 3rd floor. The tracking unit 61 of the elevator CPU 3*g* may output the image before the door opens after the elevator stops at the 3rd floor to the tracking unit 61 of the third CPU 3*c*. This allows the tracking unit 61 of the third CPU 3*c* to recognize that the persons who stepped out of the elevator EV at the 3rd floor are the subject persons A through C in a shorter time.

In the situation illustrated in FIG. 16B and FIG. 16C, the tracking unit 61 of the CPU for each floor and the tracking unit 61 of the CPU for the elevator EV exchange information in the same manner as described above. The above described process enables to track the person who moves by the elevator EV.

The image acquisition devices 2 located in the elevator EV and the elevator hall 41 may monitor the ascent and descent of the subject person by the elevator by pattern matching with the head image acquired when he/she entered the office building.

The above described method identifies the subject person who rides and steps out of the elevator EV based on the head image thereof, but may identify the subject person based on the size of the image of the head. This recognition method is effective especially when the difference in the size of the image of the head when standing is large between the subject persons riding the elevator EV.

(4) Tracking Process of the Subject Person in the Stairway

The tracking in the stairways 24 is performed with basically the same method as that of the tracking process of the subject person on the 1st floor. However, when there is a difference in the height direction (Z direction) like stairs, the size of the captured image of the head varies in accordance with a position (stair) in the stairway on which the subject person is standing even in the same standing posture. Thus, if the posture of the subject person is simply identified based on the image of the head of the subject person, the sight of the subject person may be lost, or the posture of and the change of the posture of the subject person may be recognized incorrectly.

Thus, the present embodiment stores the difference between stairs of the stairway in association with the imaging position of the image sensor of the image capturing unit 8 in the flash memory 16 of the image acquisition device 2 located in the stairway. For example, the flash memory 16 stores data associating a position of each stair of which images are captured by the image capturing unit 8 in the XY plane with a height at the position. More specifically, the flash memory 16 stores data associating the position of the first stair in the XY plane with the height from the zeroth stair of the stairway (e.g. 170 mm), and the position of the second stair in the XY plane with the height from the zeroth stair of the stairway (e.g. 340 mm).

This configuration allows the processing unit 18 of each CPU to detect the posture of the subject person in consideration of the position (XY position) of the stair on which the subject person is present and the height of the stair, and thereby to detect the posture of the subject person with a high degree of accuracy.

As the stairway has a narrow width and a height difference, the wide-angle lens system 32 of the image capturing unit 8 located in the stairway may be changed to a wide-angle lens system for a stairway. The wide-angle lens system in this case may basically have the same structure (three-group structure) described above and include the same number of lenses, but the focal length is changed to, for example, 9 mm in consideration of the height difference from the 1st floor to the 2nd floor (approximately 3500 mm through 4000 mm). Such a configuration allows the highly-accurate tracking of the subject person. The number of the image acquisition devices 2 for the stairway may be arbitrarily selected in accordance with the height of the stair and the position of a landing.

(5) Tracking Process of the Subject Person on the 2nd Floor Through the 6th Floor On the 2nd floor through 6th floor, the same process as the tracking process on the 1st floor is performed. In this case, the subject person is continuously tracked with the results of the tracking process in the elevator and the stairway.

(6) Determination of a Problem Based on the Posture of the Subject Person

The processing unit 18 normally determines that there is something wrong with the subject person when a state where the subject person is lying on the floor continues for a given time period (determined by the posture determination unit 62) while tracking the subject person. The processing unit 18 can acquire the time at which the subject person started lying on the floor and the time period for which the subject person keeps lying on the floor from the posture determination units 62 of the CPUs 3*a* through 3*g*.

However, the subject person sometimes works sitting on a chair for a long time period in the office. To prevent this situation from being detected as a problem, the size of the image of the head when the subject person sits on a chair is stored in the flash memory 16, and the processing unit 18 determines that there is nothing wrong because a state where the subject person is sitting on a chair continues when the size of the image of the head remains the size when he/she sits on a chair, for example. In this case, the flash memory 16 may store information about the position (XY positional information) at which the desk is located in association with the imaging position of the image sensor 36. This allows the determination of the problem with a higher degree of accuracy.

(7) Control for Image Capturing Timing of the Image Capturing Unit 8 Based on the Presence or Absence of the Subject Person As described previously, although the pyroelectric sensor 12 can be used to control the image capturing timing, the overlap of the adjoining image capturing regions may be used to control the image capturing timing.

For example, image capture of a head of a person in an overlapping region of the image capturing unit 8 is used as a trigger to allow the processing units 18 of the CPUs 3*a* through 3*g* to cause the other image capturing unit 8 corresponding to the overlapping region to start capturing images when the number of people in the office is small. This configuration enables to reduce the power consumption because the image capture can be stopped (the power supply to the image capturing unit 8 can be stopped) when no one is present in the image capturing region. In addition, the pyroelectric sensor 12 can be eliminated.

The overlap of parts of the image capturing regions of the image capturing units 8 is applied to the image capturing units 8 located in the stairway, and thus the above described control may be performed between the image capturing unit 8 near the stairway and the image capturing unit 8 located in the stairway. This allows the reduction of the power consumption in the image capturing unit 8 located in the stairway. In this case, if the stairway is an emergency stairway, it is not used so much in normal times, and thus the reduction of the power consumption is especially effective.
(Process when a Disaster (Fire) Occurs)

Figure 17:
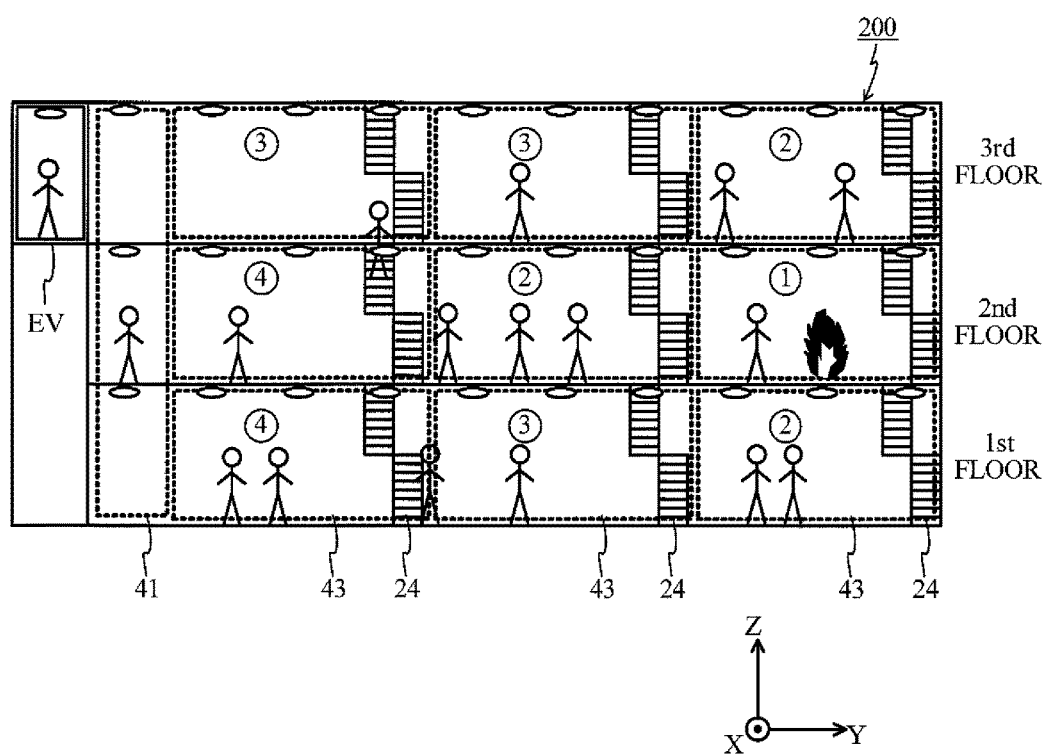
FIG. 17 is a diagram illustrating a situation where a fire occurs in the office building.

When a disaster (fire) occurs, the following process is performed in addition to the above described process in normal times. In the present embodiment, assume that a fire occurs at the section at +Y end on the 2nd floor of the office building 200 as illustrated in FIG. 17. For ease of explanation, only the 1st floor through 3rd floor of the office building 200 are illustrated.

In this case, the guidance control unit 51 of the host computer 4 overall controls all the image acquisition devices 2 via the CPUs 3a through 3g, and executes the process that guides people so that all the people in the office building 200 can evacuate outside the office building 200.

Figure 18:
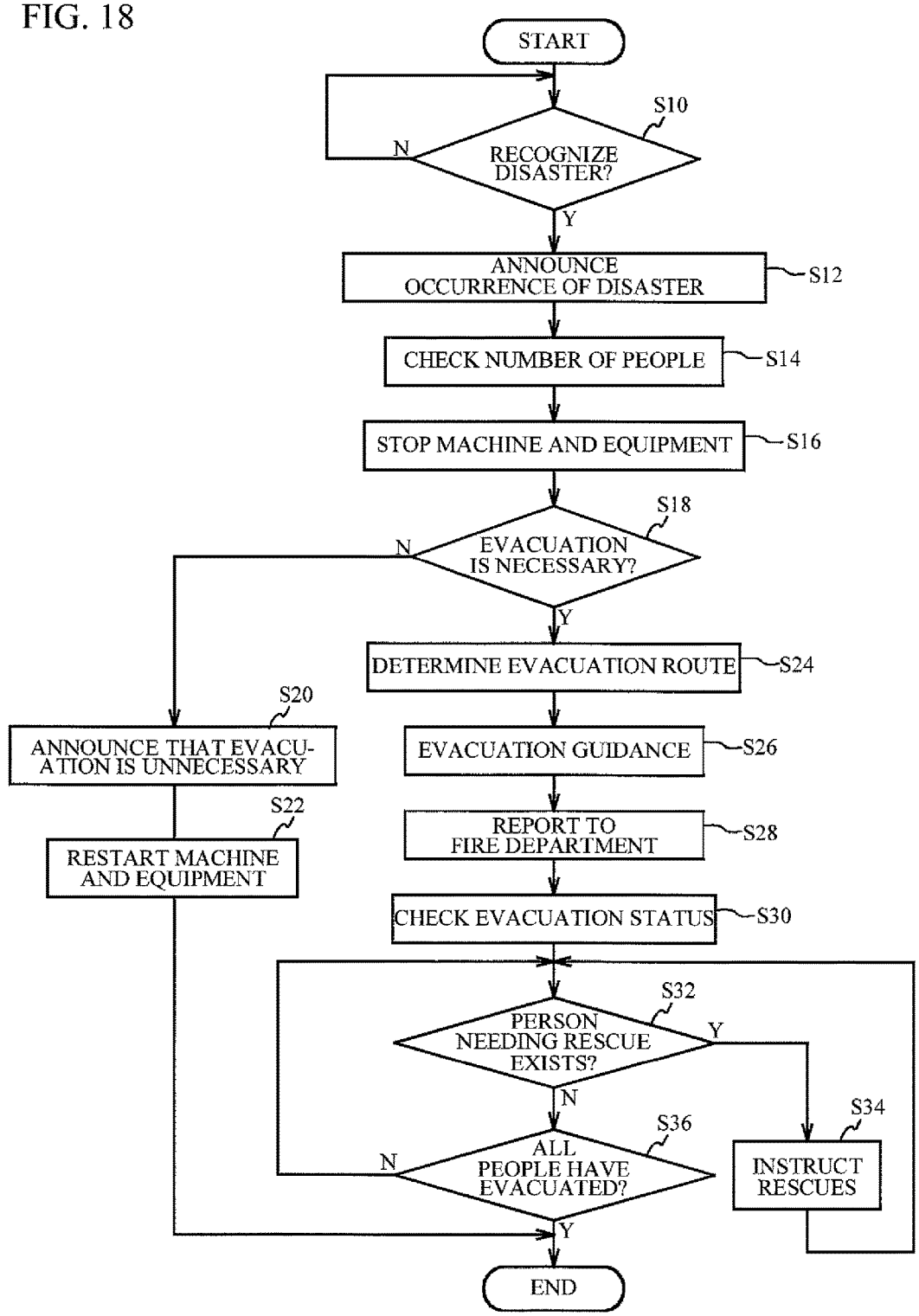
FIG. 18 is a flowchart illustrating an evacuation guidance process.

More specifically, the guidance control unit 51 executes a process along a flowchart illustrated in FIG. 18.

In the process illustrated in FIG. 18, the guidance control unit 51 of the host computer 4 waits till it recognizes a disaster at step S10. In this case, if a fire occurs on the 2nd floor of the office building 200 as illustrated in FIG. 17, the fire detector 15 of the image acquisition device 2 located near the fire detects the fire, and the detection result is supplied to the second CPU 3b and the host computer 4 via the communication unit 9. This allows the guidance control unit 51 to recognize that a fire occurs at the section at +Y end on the 2nd floor. As described above, when the fire is recognized, the determination at step S10 becomes YES, and the process moves to step S12. The guidance control unit 51 acquires the time when the fire occurred from the calendar unit 6, and the calendar unit 6 starts counting time from the time when the fire occurred. This is for setting, for example, 10 minutes as the time till when the evacuation is to be finished from the occurrence of the fire when the evacuation guidance is performed. The guidance control unit 51 may shorten the image capturing intervals of the image capturing unit 8 when a disaster is recognized compared to normal times. In addition, the guidance control unit 51 may switch the images captured by the image capturing unit 8 from still images to video images when a disaster is recognized.

At step S12, the guidance control unit 51 activates sprinklers near the location where the fire occurs via the input/output unit 97 to extinguish fire, and announces the occurrence of the fire to the office from the speakers 14 of all the image acquisition devices 2.

Then, at step S14, the guidance control unit 51 checks the number of people in the office building 200 acquired by the CPUs (3a through 3f) for respective floors and the elevator CPU 3g. The CPUs 3a through 3g can acquire the number of people based on the head images acquired by respective image acquisition devices 2. At this point, the guidance control unit 51 checks whether the number of people acquired as described above is equal to the number of people calculated by subtracting the number of people who left the office building 200 obtained by the tracking from the number of people to which the entry process was performed. It is no problem as long as the numbers of people are identical, but when the numbers of people differ, the guidance control unit 51 recognizes the difference in the number of people, and identifies the person who has not been tracked by the tracking process of the tracking unit 61. The reason why the tracking process fails may be because the image acquisition device 2 close to the fire is damaged, or the image of the head can not be captured because of smoke.

Then, at step S16, the blocking unit 55 stops the drive of the machines that are preliminary determined to be stopped when a disaster occurs. In this case, the blocking unit 55 stops the machines in an appropriate state. For example, the blocking unit 55 stops the elevator EV at the nearest floor other than the 2nd floor at which the fire occurs, opens the door thereof, and stops the move thereafter.

At step S18, the guidance control unit 51 determines whether an evacuation is necessary. Here, the guidance control unit 51 can determine whether the evacuation is necessary based on the images transmitted from the image acquisition device 2 near the fire or whether the image acquisition device 2 near the fire can drive without being affected by the fire. When the determination is NO, that is to say, when the evacuation is not necessary because the fire is being extinguished by the sprinklers and settled down, the process moves to step S20. On the other hand, when the determination is YES, that is to say, the evacuation is necessary, the process moves to step S24.

When the process moves to step S20, the guidance control unit 51 announces that the evacuation is not necessary from the speakers 14. In addition, the blocking unit 55 restarts the machines that were stopped at step S22, and ends the entire process illustrated in FIG. 18.

On the other hand, when the process moves to step S24, the route determination unit 57 determines an evacuation route. In this case, the route determination unit 57 leads the subject persons to evacuate in the order from the subject person close to the fire. The present embodiment sets the location of the fire as first priority (indicated by circled number 1 in FIG. 17), the section above, below, and adjacent to the location of the fire as second priority (indicated by circled number 2), the section on the floor above the floor on which the fire occurs and the center section on the 1st floor as third priority (indicated by circled number 3), and other sections as fourth priority (indicated by circled number 4) as illustrated in FIG. 17. The reason why the center section on the 1st floor is set as the third priority is to prevent people from concentrating at the exit on the 1st floor when people present on upper floors evacuate. The setting of the priority is not limited to the above way of setting, and may be configured with various ways of setting. For example, the route determination unit 57 may calculate a distance from a reference position (e.g. location of a fire) based on the position of the subject person (detected by the processing unit 18), and determine the method for the guidance based on the distance. This can also guide the subject person appropriately. In addition, instead of using the priority, the route determination unit 57 may determine the evacuation route that causes people to use a stairway other than the stairway close to the fire without using the stairway close to the fire and allows people not to concentrate at one stairway.

In addition, the route determination unit 57 may determine whether the subject person can pass through the passage in the office building 200 based on the captured result by the image capturing unit 8 to determine a guide route based on the determination result. In this case, the route determination unit 57 compares (pattern-matches) a sample image (reference image) preliminarily captured in normal times to an image in a time of disaster (i.e. image captured after the sample image is captured). Then, it may be determined whether the subject person can pass through the passage based on a degree of the difference between them. When the difference is large, a file cabinet or the like may fall down for example. Therefore, the above described determination enables to provide an appropriate evacuation route to the subject person.

The route determination unit 57 may only display the result of the pattern matching between the sample image and the image in a time of disaster together with the image in a time of disaster on the display device 91. In this case, the display priority may be set higher as the difference between the sample image and the image in a time of disaster obtained by pattern matching increases, and the captured result may be displayed based on the priority. If the person who checks the content displayed on the display device 91 changes the evacuation route (inputs the appropriate evacuation route to the host computer 4) when he/she confirms the image in a time of disaster with reference to the display priority and determines that the subject person can not pass through the passage, the subject person can evacuate along the appropriate evacuation route.

At step S26, the evacuation guidance is started. More specifically, the guidance control unit 51 asks the evacuation without using the stairway near the fire from the speakers 14 of the image acquisition devices 2 in a region indicated by circled number 1 in FIG. 17. At this time, the guidance control unit 51 may visually indicate the evacuation route by lighting the LEDs 11 of the image acquisition devices 2 sequentially along the evacuation route. The guidance control unit 51 sequentially leads the people present in regions indicated by circled numbers 2 through 4 to evacuate.

At step S28, the guidance control unit 51 reports the fire to the fire department through the input/output unit 97. At next step S30, the movement determination unit 53 checks the evacuation status using the captured results by the image acquisition devices 2 located on respective floors. Here, even in the situation that the image acquisition device 2 near the fire can not capture images, the movement determination unit 53 can estimate the evacuation status from the captured result by the image acquisition device 2. This is because while the subject person is always tracked in the office building 200 as described previously and the evacuation status of the subject person who can be tracked can be obtained, the image of the subject person who has failed to be tracked is suddenly captured by the image acquisition device 2. That is to say, the present embodiment identifies the subject person whose image is not captured by any one of the image capturing units at a certain moment (first moment) from the subject persons whose image is to be captured by any one of the image capturing units 8 (expect to be captured) and determines that the subject person whose image was not captured at the certain moment (first moment) but is captured at a moment thereafter (second moment) by the image capturing unit is the subject person identified at the first moment.

At step S32, the guidance control unit 51 checks whether there is a person who needs rescue. In this case, when the size and the position of the captured image of the head changes little in the determination result of the posture determination unit 62, it means that the subject person can not move. Thus, the guidance control unit 51 determines whether there is the head image in the above described state using the determination result of the posture determination unit 62. When the rescue is necessary, the voice such as "Help" may be input from the microphone 13 of the image acquisition device 2. Thus, the guidance control unit 51 may determine that there is a person who needs rescue when such voice is input. Further, the image capturing unit 8 can continuously capture the images of the eye and mouth of the subject person when the subject person is lying on the floor, and thus the guidance control unit 51 may determine a person who can not move (e.g. person who is unconscious) based on the image continuously captured. The process moves to step S36 when the determination at step S32 is NO, while the process moves to step S34 when the determination is YES.

When the process moves to step S34, the guidance control unit 51 performs the process that causes the rescue work. More specifically, the guidance control unit 51 displays the layout of the office building 200 on the display device 91 in FIG. 2, and blinks the region in which the person who needs the rescue is present. Then, the guidance control unit 51 reports the region (section) in which the person who needs rescue is present to the fire department through the input/output unit 97. The guidance control unit 51 displays the counted time from the recognition of the disaster at step S10 (elapsed time) on the display device 91, and reports the counted time (elapsed time) to the fire department. After step S34, the process goes back to step S32.

On the other hand, when the process moves to step S36, the movement determination unit 53 determines whether all the people have evacuated. More specifically, the movement determination unit 53 checks how many subject persons come out of the office building 200 based on the captured result by the image acquisition device 2 located near the entrance (exit) on the 1st floor. The movement determination unit 53 may check the number of people who remain in the office building 200 based on the captured result by the image acquisition device 2 located near the entrance (exit) on the 1st floor. In this case, the movement determination unit 53 can determine that all the people in the office building 200 have evacuated when the number of heads of which images are no longer captured is equal to the number of people to whom the entry process was performed at the time when images captured by all the image acquisition devices 2 in the office building 200 do not include a head image. When the determination at step S36 is NO, the process goes back to step S32.

Then, the process and determination of steps S32 and S36 (or S34) are repeated till the determination at step S36 becomes YES.

At step S36, the number of heads of which images are no longer captured may fail to be equal to the number of people to whom the entry process was performed even though images captured by all the image acquisition devices 2 do not include a head image. In such a case, the person who has not evacuated is likely to be present in a region in which the image acquisition device 2 incapable of capturing images due to the fire is installed. Therefore, in such a case, the guidance control unit 51 blinks the section in which the image acquisition device 2 incapable of capturing images is located on the display device 91 and reports that to the fire department at next step S34.

The process illustrated in FIG. 18 checks the evacuation status at the step S30, and thus the blocking unit 55 can close the protective barrier so that the passage in which a subject person is not present is closed based on the result of check.

As described in detail above, the present embodiment includes the image capturing units 8 that capture images containing the subject person from above (+Z direction), the processing unit 18 that detects a size of an image of a head of the subject person from the images captured by the image capturing units 8; and the guidance control unit 51 that guides the subject person based on a detection result of the processing unit 18, and thus can guide the subject person while protecting the privacy of the subject person by guiding the subject person based on the size of the image of the head of the subject person.

In addition, the present embodiment includes the movement determination unit 53 that detects positional information of the subject person from the images captured by the image capturing units 8 and determines whether the subject person moves according to the guidance based on the positional information of the subject person, and thus can check whether the subject person moves according to the guidance while protecting the privacy of the subject person.

In addition, the present embodiment configures the guidance control unit 51 to hold a height of the subject person, a size of the head of the subject person, and personal identification information as data (see FIG. 11), acquire the posture of the subject person determined by the posture determination unit 62 based on the data and the size of the image, and guide the subject person based on the postural information, and thus can appropriately guide the subject person.

In addition, the present embodiment configures the guidance control unit 51 to determine whether the subject person is in a state where the subject person can be guided based on a detection result (posture of the subject person) of the posture determination unit 62. That is to say, it is determined whether the subject person can be guided from a determination result of a posture such as standing, semi-crouching, or lying on a floor based on the size of the image of the head, and thus the determination whether the subject person can be guided becomes possible while protecting the privacy.

In addition, the present embodiment configures the posture determination unit 62 to detect a change of the size of the image of the head of the subject person from moment to moment, and the guidance control unit 51 to determine that the subject person is not in the state where the subject person is able to be guided when capable of determining that the subject person keeps lying on a floor and fails to move for a predetermined time period based on the change of the size of the image of the head of the subject person from moment to moment. This configuration enables to appropriately recognize a state of the subject person, and perform guidance or other processes.

In addition, the present embodiment configures the guidance control unit 51 to identify the subject person whose image is not captured by the image capturing unit at a certain moment (first moment) from the subject persons whose images are to be captured by any one of the image capturing units 8, and determine that the subject person whose image is not captured by the image capturing unit at the first moment but is captured at a subsequent moment (second moment) is the subject person identified at the first moment (step S30). Thus, even though a part of the image capturing units that track a certain subject person is broken, use of captured results by other image capturing units allows the continuous tracking of the certain subject person.

In addition, the present embodiment configures the blocking unit 55 to drive a protection barrier to block the passage in which the subject person is not present, and thus can reduce the occurrence of human damage by a toxic gas in a time of disaster.

In addition, in the present embodiment, in two spaces that are the elevator EV and the elevator hall 41, a person whose image starts to be captured by the image capturing unit located in a first space is estimated as the subject person whose image become not captured by the image capturing unit located in a second space when the subject person whose image has been captured by the image capturing unit located in the second space becomes not imaged, and thus the tracking can be performed even when the subject person moves by the elevator EV.

In addition, the present embodiment arranges image capturing units so that a part of the image capturing unit of an image capturing unit (first image capturing unit) out of the image capturing units overlap a part of the image capturing region of another image capturing unit (second image capturing unit), and thus can track the subject person with a high degree of accuracy by tracking the subject person using images captured by the image capturing units having the overlapping region even when the subject person moves across the image capturing regions of the image capturing units.

In addition, the present embodiment configures the route determination unit 57 to determine whether a passage is travelable by the subject person based on a captured result by an image capturing unit and determine a guidance route based on the determination result, and thus can provide an appropriate evacuation route to the subject person. In this case, the route determination unit 57 determines whether the subject person can pass through the passage based on a difference between a sample image (reference image) preliminarily captured by the image capturing unit and an image captured after the sample image is captured. Therefore, the fact that a large furniture such as a file cabinet falls down and obstructs the passage can be automatically recognized from the image, and thus the provision of the appropriate evacuation route based on the recognition result becomes possible.

In addition, the present embodiment uses the size of the image of the head of the subject person captured from the vertical direction (+Z direction) to acquire the postural state of the subject person, and thus can detect the position of the head of the subject person in the vertical direction (i.e. postural information) with a high degree of accuracy compared to using the image of the head captured from other directions.

The present embodiment includes the image capturing unit (first image capturing unit) 8 that captures an image containing a subject person from above (+Z direction), the image capturing unit (second image capturing unit) 8 that is separate from the first image capturing unit and that captures an image containing the subject person from above (+Z direction), and the processing unit 18 that detects information about a size of a head of the subject person from the images captured by the image capturing units 8, and a part of the image capturing region of the image capturing unit 8 (first image capturing unit) overlap a part of the image capturing region of the image capturing unit 8 (second capturing unit) in the image capturing units 8. This configuration allows the continuous detection of the subject person with a high degree of accuracy by using both the image capturing units of which the image capturing regions overlap each other even when the subject person moves between the image capturing regions.

In addition, in the present invention, the overlapping amount is an amount based on the size of the head, and thus the information about the size of the image of the head can be continuously detected with a high degree of accuracy when the subject person moves across the image capturing regions.

In addition, the present embodiment configures the posture determination unit 62 to determine the postural state of the subject person based on the detection result of the processing unit 18, and thus allows the postural state of the subject person to be continuously determined with a high degree of accuracy In this case, the posture determination unit 62 acquires a height of the subject person, the size of the head of the subject person, and personal information as data, and determines the postural state of the subject person from the data and the detected size of the image of the head of the subject person, and thus the postures of the subject persons can be determined in consideration of the heights and the sizes of the images of the heads of the subject persons.

In addition, in the present embodiment, at least one of the image capturing units is located in a position from which an image of the stairway can be captured, and thus the posture determination unit 62 can determine the postural state of the subject person from the size of the image of the head of the subject person in consideration of a height position of a stair on which the subject person is present. This configuration allows the determination of the posture of the subject person without being affected by the height of the stair.

In addition, the present embodiment switches, when one image capturing unit out of the image capturing units 8 captures an image of the subject person, at least one of start and stop of image capture by an image capturing unit having an image capturing region overlapping with a part of the image capturing region of the one image capturing unit, and thus can reduce power consumption of the image capturing unit, and starts image capture by the image capturing unit at appropriate timing.

In addition, the processing unit 18 can calibrate the image capturing units of which parts of the image capturing regions overlap each other with the captured results by the image capturing units of which parts of the image capturing regions overlap each other, and thus the influence of capture error between the image capturing units can be reduced.

In addition, the present embodiment includes the image capturing unit 8 that captures an image containing the subject person from above (+Z direction), the processing unit 18 that detects a size of an image of a head of and positional information (positional information in a horizontal plane (XY plane)) of the subject person, the posture determination unit 62 that acquires height information of the image capturing region of the image capturing unit and determines the posture of the subject person based on a detection result of the processing unit 18 and the acquired height information. Thus, the posture of the subject person can be determined with a high degree of accuracy even when the size of the image of the head varies according to the change in position of the subject person in the horizontal plane despite the same posture of the subject person.

In addition, the present embodiment includes the pyroelectric sensor 12 that detects a presence of the subject person within the image capturing region of the image capturing unit 8, and the image capturing unit 8 switches at least one of start and stop of image capture based on a detection result of the pyroelectric sensor 12, and thus the power consumption of the image capturing unit 8 can be reduced effectively.

In the above described embodiment, the image capturing unit 8 is located on the ceiling and the image of the head of the subject person is captured from above. However, the image capturing unit 8 may be located in the position that allows it to capture the image of the subject person from the side. The image of the subject person captured from the side can ease the determination of the movement of the eye, mouth, and nose. Further, the determination with a high degree of accuracy becomes possible by determining whether the subject person is normal using both a still image captured by the image capturing unit 8 located on the ceiling and a still image of the subject person captured from the side.

The above described embodiment may use a CMOS for the image sensor 36 of the image capturing unit 8, and may use an electronic shutter (rolling shutter) instead of a mechanical shutter. In this case, the sound in capturing images (shutter sound) can be reduced. This configuration can prevent the image capture from affecting the smooth performance of the work of the subject person.

In the above embodiment, the image capturing unit 8 captures still images, but may capture video images instead. In this case, the video images may be continuously captured, or short video images each lasting 3 to 5 seconds may be captured intermittently. When the image capturing unit 8 captures video images, the processing unit 18 may process the image signal using MPEG and store it in the flash memory 16.

In the above described embodiment, the guidance control unit 51 changes the image capture intervals of the image capturing unit 8 when a disaster occurs (step S10). However, the posture determination unit 62 may change the image capture intervals of the image capturing unit 8 when it determines that there is something wrong with the subject person for example.

The above described embodiment determines the position and the posture of the subject person based on the captured result by the image capturing unit 8, but does not intend to suggest any limitation, and the position of the subject person may be detected with a device (laser range finder, or the like) that emits a light beam toward the subject person and receives the light beam reflected by the subject person to detect the position of the subject person.

The above described embodiment may cause the image capturing region of the image capturing unit 8 located in the elevator EV to overlap the image capturing region of the image capturing unit 8 located in the elevator hall 41. This configuration allows the tracking of the movement of the subject person between the elevator EV and the elevator hall 41 with the same method described for FIG. 13A through FIG. 14C.

The above described embodiment measures the height by capturing the image of the subject person from the side, but does not intend to suggest any limitation. For example, a structural object (e.g. a door) in the office and the subject person may be simultaneously imaged to estimate the height of the subject person using the known size of the structural object (e.g. the door is 2 m in height and 1 m in width). In this case, the size of the structural object may be stored in the flash memory 16.

The above described embodiment omits the description, but the tracking by the image capturing unit 8 is aborted in a private space (e.g. rest room). Even in such a case, the tracking can be restarted by re-identifying the person who comes out of the private space with the height, the size of the image of the head, and the head image. In addition, when the subject person hides under the desk in case of earthquake, the process same as the above can be performed.

The above described embodiment may check whether the tracked subject person is not falsely recognized at appropriate timing. This check may be performed with information (personal ID or the like) acquired when the subject person enters or leaves a room with an employee card or information when logging in the personal computer in the office building 200.

In the above described embodiment, the blocking unit 55 controls the drive of the protective barrier (fire door), but may control the drive of a ventilation equipment such as a ventilation duct.

The above described embodiment configures the processing unit 18 to detect the size of the image of the head of the subject person as the size of the image of the subject person, but does not intend to suggest any limitation. For example, the processing unit 18 may detect a shoulder width as the size of the image of the subject person.

The above described embodiment describes a case where the subject person is guided to the outside of the office building 200 from the entrance on the 1st floor of the office building 200 at a time of evacuation, but does not intend to suggest any limitation. For example, in a case of a high-rise building, the subject person may be evacuated to a rooftop (heliport). In addition, the evacuation area and the evacuation procedure may be appropriately changed in accordance with the type of disaster. Further, the evacuation area may change depending on the floor of the office building 200.

The above described embodiment adopts the guidance system of the present invention for evacuation at a time of disaster, but does not intend to suggest any limitation. For example, it may be adapted to guide people in the office building 200 to a meeting place or a hall.

While the exemplary embodiments of the present invention have been illustrated in detail, the present invention is not limited to the above-mentioned embodiments, and other embodiments, variations and modifications may be made without departing from the scope of the present invention.

What is claimed is:

1. A detection device comprising:
   a first image capture that captures an image containing a subject person from a first direction;
   a second image capture that is separate from the first image capture and captures an image containing the subject person from the first direction;
   an adjuster that adjusts at least one of the first image capture and the second image capture so that a predetermined subject can be contained in a region in which an image capturing region of the first image capture and an image capturing region of the second image capture overlap each other;
   a detector that detects a size of an image corresponding to a head of the subject person by way of image capturing performed by at least one of the first image capture and the second image capture; and a determiner that determines a postural state of the subject person based on (i) a relation between a height of the subject person and the size of the image corresponding to the head of the subject person, (ii) identification information of the subject person, and (iii) a change in the size of the image corresponding to the head of the subject person.

2. The detection device according to claim 1, wherein the adjuster adjusts an installation position or an optical system of the at least one of the first image capture and the second image capture.

3. The detection device according to claim 1, wherein the adjuster uses a human body as the predetermined subject.

4. The detection device according to claim 1, wherein at least one of the first image capture and the second image capture is located in a position from which an image of a stairway can be captured.

5. The detection device according to claim 4, wherein the determiner determines the postural state of the subject person from the size of the image in consideration of a height position of a stair on which the subject person is present.

6. The detection device according to claim 1, further comprising: a tracker that tracks the subject person by successively using captured results by the first and second image captures of which parts of the image capturing regions overlap each other.

7. The detection device according to claim 1, wherein at least one of start and stop of image capture by the second image capture is switched when an image of the subject person is captured by the first image capture.

8. The detection device according to claim 1, wherein: the first direction is a vertical direction, and the first image capture and the second image capture capture the images from above the head of the subject person.

9. The detection device according to claim 1, wherein the adjuster uses a human head as the predetermined subject.

10. A position assessment device comprising:
    an image capture that captures an image containing a subject person from a first direction;
    a detector that detects a size of an image of the subject person and positional information of the subject person in an image capturing region of the image capture from the image; and
    a memory that stores positional information of the image capture and stores data in which a position in a floor is related to a height of the floor at the position; and
    a determiner that determines a postural state of the subject person based on a (i) the size of the image of the subject person detected by the detector, (ii) the positional information of the subject person, (iii) the positional information of the image capture, and (iv) the data stored in the memory
    wherein the determiner also determines the postural state of the subject person based on a height of the subject person and a size of an image corresponding to a head of the subject person.

11. The position assessment device according to claim 10, wherein a region of which an image is captured by the image capture includes at least a part of a stairway that the subject person ascends and descends.

12. The position assessment device according to claim 10, further comprising: a detector that detects a presence of the subject person within the image capturing region of the image capture, wherein the image capture switches at least one of start and stop of image capture based on a detection result of the detector that detects the presence of the subject person.

13. The position assessment device according to claim 10, wherein the determiner acquires information indicating a height of a floor at a position of the subject person based on the positional information of the subject person and the data.

* * * * *